(12) United States Patent
Hosotani et al.

(10) Patent No.: US 12,288,854 B2
(45) Date of Patent: Apr. 29, 2025

(54) WIRELESSLY CHARGEABLE BATTERY

(71) Applicant: Murata Manufacturing Co., Ltd., Kyoto-fu (JP)

(72) Inventors: Tatsuya Hosotani, Nagaokakyo (JP); Kiyokazu Yamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 537 days.

(21) Appl. No.: 17/716,370

(22) Filed: Apr. 8, 2022

(65) Prior Publication Data

US 2022/0231348 A1 Jul. 21, 2022

Related U.S. Application Data

(63) Continuation of application No. PCT/JP2020/030602, filed on Aug. 11, 2020.

(30) Foreign Application Priority Data

Oct. 11, 2019 (JP) .................. 2019-188230

(51) Int. Cl.
| | |
|---|---|
| *H01M 10/46* | (2006.01) |
| *H01G 11/14* | (2013.01) |
| *H01M 10/42* | (2006.01) |
| *H01M 50/202* | (2021.01) |
| *H01M 50/213* | (2021.01) |
| *H02H 7/16* | (2006.01) |

(Continued)

(52) U.S. Cl.
CPC ............ *H01M 10/46* (2013.01); *H01G 11/14* (2013.01); *H01M 10/4257* (2013.01); *H01M 50/202* (2021.01); *H01M 50/213* (2021.01); *H02H 7/16* (2013.01); *H02H 7/18* (2013.01); *H02J 7/0029* (2013.01); *H02J 7/007* (2013.01); *H02J 50/10* (2016.02); *H02J 50/70* (2016.02); *H01M 2010/4278* (2013.01); *H01M 2220/30* (2013.01)

(58) Field of Classification Search
CPC ...... H02J 7/007; H02J 7/16; H02J 7/18; H02J 7/0029; H02J 7/0042; H02J 50/005; H02J 50/12; H01M 50/213; H01M 2010/4278; H01M 2220/30
USPC .................. 320/103, 108, 110, 114, 115
See application file for complete search history.

(56) References Cited

FOREIGN PATENT DOCUMENTS

| | | |
|---|---|---|
| JP | S57-011466 A | 1/1982 |
| JP | 2004-312888 A | 11/2004 |

(Continued)

OTHER PUBLICATIONS

International Search Report issued in PCT/JP2020/030602; mailed Oct. 27, 2020.

*Primary Examiner* — Edward Tso
(74) *Attorney, Agent, or Firm* — Studebaker Brackett PLLC

(57) ABSTRACT

A secondary battery, a wireless charging circuit connected to the secondary battery, an outer casing member that has an outer shape equivalent to an outer shape of a universal battery and accommodates the secondary battery and the wireless changing circuit, and a positive terminal and a negative terminal that are electrically connected to the secondary battery and are provided at positions corresponding to positions of a positive terminal and a negative terminal, respectively, of the universal battery, are provided. The wireless charging circuit includes a power reception protecting circuit that stops power reception at a rectifier circuit in a case where a received voltage exceeds a predetermined voltage range.

20 Claims, 19 Drawing Sheets

(51) Int. Cl.
*H02H 7/18* (2006.01)
*H02J 7/00* (2006.01)
*H02J 50/10* (2016.01)
*H02J 50/70* (2016.01)

(56) References Cited

FOREIGN PATENT DOCUMENTS

| | | |
|---|---|---|
| JP | 2015-053754 A | 3/2015 |
| JP | 5798407 B2 | 10/2015 |
| WO | 98/58437 A1 | 12/1998 |
| WO | 2012/067522 A1 | 5/2012 |
| WO | 2013/021801 A1 | 2/2013 |
| WO | 2017/213032 A1 | 12/2017 |
| WO | 2019/044567 A1 | 3/2019 |

WIRELESSLY CHARGEABLE BATTERY

CROSS-REFERENCE TO RELATED APPLICATIONS

This application claims benefit of priority to International Patent Application No. PCT/JP2020/030602, filed Aug. 11, 2020, and to Japanese Patent Application No. 2019-188230, filed Oct. 11, 2019, the entire contents of each are incorporated herein by reference.

BACKGROUND

Technical Field

The present disclosure relates to a wirelessly chargeable battery including a secondary battery and a wireless charging circuit connected to the secondary battery.

Background Art

In Japanese Patent No. 5798407, a contactless chargeable secondary battery including a secondary battery and a wireless power transmission circuit that are housed in an outer casing is suggested. Specifically, the contactless chargeable secondary battery includes a power reception circuit that includes an alkaline secondary battery, a power receiving coil, and a resonant capacitor connected in parallel to the power receiving coil and receives AC power through a magnetic field from a power transmission device; a rectifier circuit that rectifies the AC power received at the power reception circuit; a circuit limiting circuit that limits a charging current flowing from the rectifier circuit to the alkaline secondary battery; and an outer casing of a cylindrical shape including a positive terminal and a negative terminal that are connected to the alkaline secondary battery. The configuration in which the power receiving coil is provided along an inner circumferential surface of the outer casing is described.

SUMMARY

The contactless chargeable secondary battery described in Japanese Patent No. 5798407 is assumed to include a casing of a tubular shape and be an alkaline secondary battery interchangeable with a dry battery. Such a contactless chargeable secondary battery is assumed to be chargeable in a state in which the contactless chargeable secondary battery is placed close to a charging device dedicated to charging the contactless chargeable secondary battery. Thus, under the circumstance in which an external magnetic field having a size exceeding a predetermined value is applied, the received power might be too large, and induced voltage and induced current might be unable to satisfy the practicality or versatility.

Furthermore, the contactless chargeable secondary battery disclosed in Japanese Patent No. 5798407 is assumed to be charged as a contactless chargeable secondary battery single unit, and it is difficult to wirelessly charge the contactless chargeable secondary battery in a state in which the contactless chargeable secondary battery is attached to an electronic device. In the state in which the contactless chargeable secondary battery is attached to an electronic device, the distance, positional displacement, tilt, and the like between the power receiving coil and a power transmitting coil may vary depending on the attached state. Thus, the size of the external magnetic field viewed from the power receiving coil significantly varies depending on the attached state. In the case where the external magnetic field is small, an insufficient amount of power is received. In the case where the external magnetic field is too large, the received voltage and received power may become too large, and an electrically connected circuit or electronic component may break down or wiring may be disconnected. Therefore, it is difficult to wirelessly charge the contactless chargeable secondary battery in the state in which the contactless chargeable secondary battery is attached to an electronic device.

Thus, the present disclosure provides a universal-outer-shape wirelessly chargeable battery that is capable of being used as a power source component achieving practicality, versatility, and security by enabling both charging of a secondary battery and voltage output or only voltage output in the case where the size of an external electromagnetic field or an external magnetic field is within a predetermined range and causing a circuit connected to a power receiving coil and a power reception protecting circuit that protects an electronic component to operate and interrupting (rejecting) power reception in the case where the size of the external electromagnetic field or the external magnetic field exceeds the predetermined range.

A universal-outer-shape wirelessly chargeable battery according to an example of the present disclosure includes a secondary battery; a wireless charging circuit that is connected to the secondary battery; a housing body that has an outer shape equivalent to an outer shape of a universal battery and accommodates the secondary battery and the wireless charging circuit; and a positive terminal and a negative terminal that are electrically connected to the secondary battery and are provided at positions corresponding to positions of a positive terminal and a negative terminal, respectively, of the universal battery. The wireless charging circuit includes a power receiving coil that receives an electromagnetic field or a magnetic field having a predetermined size caused by power transmission from an outside, a rectifier circuit that rectifies a received voltage received at the power receiving coil, a first voltage conversion circuit that converts a voltage output from the rectifier circuit to generate a charging voltage, a charging control circuit that receives a voltage output from the first voltage conversion circuit and controls charging of the secondary battery, a second voltage conversion circuit that converts a voltage of the secondary battery into an output voltage to be output from the universal battery, and a power reception protecting circuit that protects the first voltage conversion circuit in a case where the received voltage exceeds a predetermined voltage range. The universal-outer-shape wirelessly chargeable battery is able to be attached to an electronic device that uses the universal battery, and wireless charging using an electromagnetic field caused by power transmission from the outside is able to be performed using the wireless charging circuit.

According to the present disclosure, a universal-outer-shape wirelessly chargeable battery that may be used as a power source component achieving practicality, versatility, and security can be obtained, in which both charging of a secondary battery and voltage output or only voltage output can be performed in the case where the size of an external electromagnetic field or an external magnetic field is within a predetermined range and a circuit connected to a power receiving coil and a power reception protecting circuit that protects an electronic component operates and power reception is interrupted (rejected) in the case where the size of the external electromagnetic field or the external magnetic field exceeds the predetermined range. Furthermore, according to the present disclosure, a universal-battery-outer-shape wirelessly chargeable battery that is able to be wirelessly charged in a single unit state or a state being mounted at a device is obtained. Furthermore, a device or an electronic circuit at which a universal-battery-outer-shape wirelessly chargeable battery according to the present disclosure is mounted is able to receive electric power from the outside through an electromagnetic field or a magnetic field caused by power transmission from the outside. Thus, there is no need to configure a wireless charging circuit in the device or the electronic circuit. Furthermore, according to the present disclosure, the secondary battery and the wireless charging circuit can be connected by a short wiring. Thus, power loss in the wiring can be reduced, and a malfunction caused by an external magnetic field can be prevented. Accordingly, downsizing and lightening, thinning, and increasing of efficiency of a device and an electronic circuit at which the universal-battery-outer-shape wirelessly chargeable battery is mounted can be achieved.

Furthermore, a device or an electronic circuit at which a universal-battery-outer-shape wirelessly chargeable battery according to the present disclosure is mounted can be used as a device or an electronic circuit including a secondary battery and a wireless charging function. Thus, downsizing and lightening and increasing of efficiency of the device or the electronic circuit can be achieved.

Furthermore, a secondary battery is able to be repeatedly charged and discharged, and battery replacement is not required, unlike a primary battery. Therefore, labor saving in maintenance can be achieved, and there is no need to dispose of primary batteries. Thus, an environmentally friendly and ecological device or electronic circuit can be provided.

DETAILED DESCRIPTION

Hereinafter, a plurality of embodiments of the present disclosure will be described by taking some specific examples with reference to drawings. In each of the drawings, the same signs are assigned to the same parts. For convenience of explanation of embodiments, taking into consideration an easier explanation and understanding of key points, a plurality of embodiments will be described separately. However, configurations described in different embodiments may be partially replaced or combined with each other. In a second embodiment and subsequent embodiments, description of items common to those in the first embodiment will be omitted, and only differences will be described. In particular, similar operational advantages owing to similar configurations will not be mentioned in each embodiment.

First Embodiment

Figure 1:
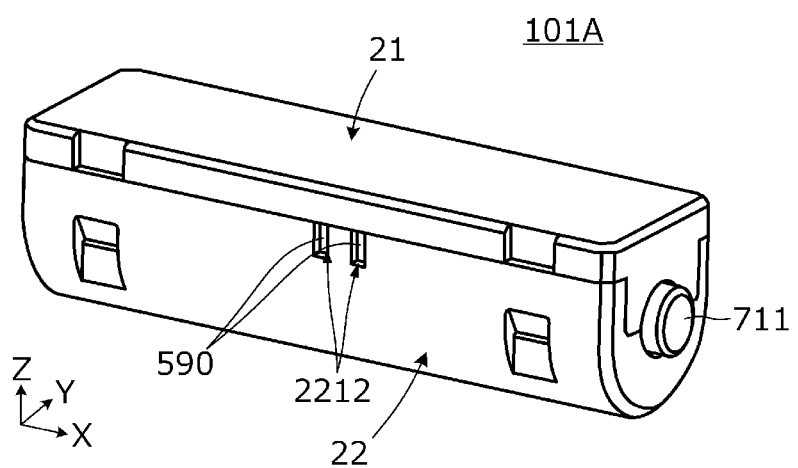
FIG. 1 is an external perspective view of a universal-battery-outer-shape wirelessly chargeable battery according to a first embodiment.
Figure 2:
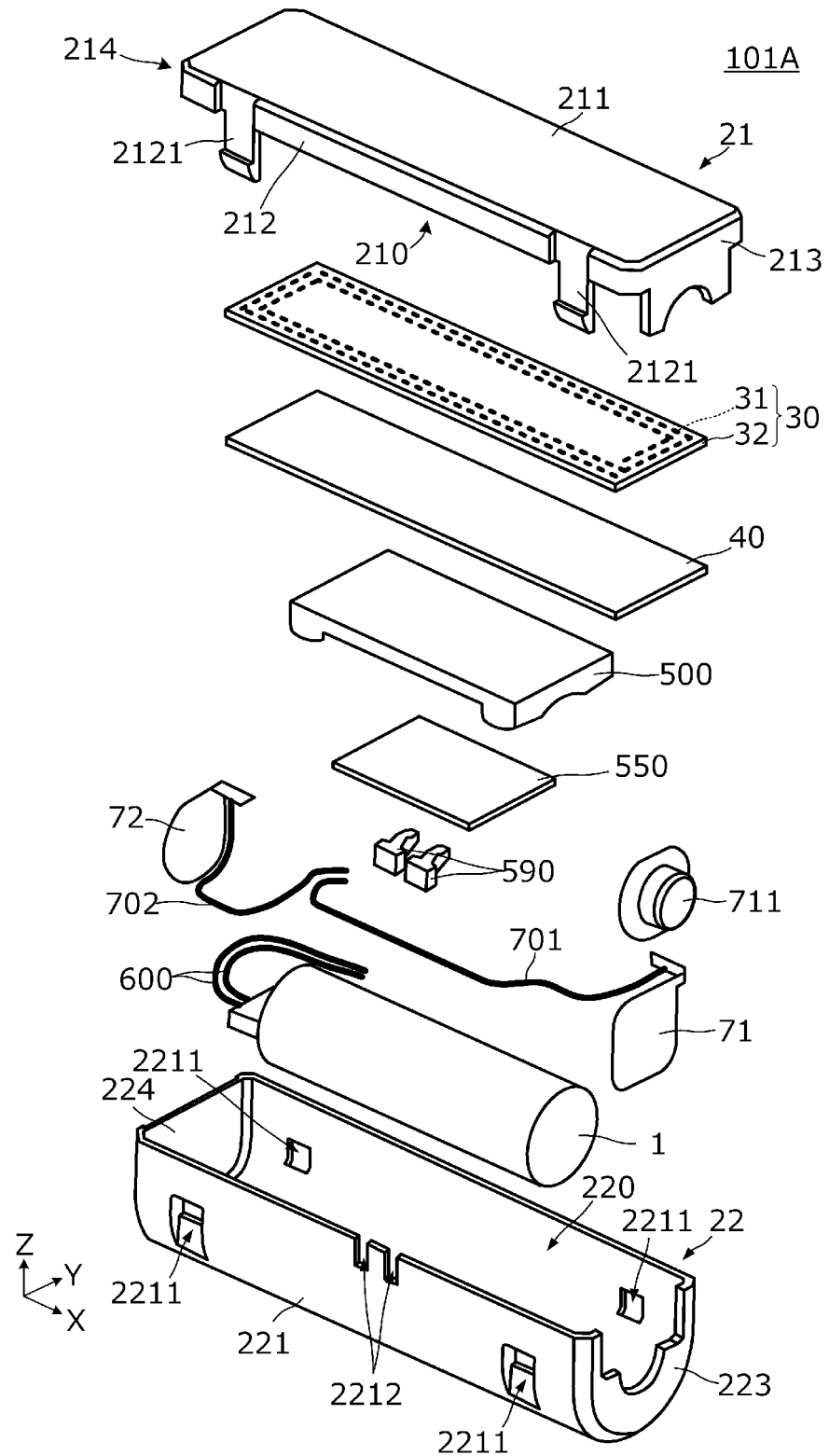
FIG. 2 is an exploded perspective view of the universal-battery-outer-shape wirelessly chargeable battery.

FIG. 1 is an external perspective view of a universal-battery-outer-shape wirelessly chargeable battery 101A according to a first embodiment. FIG. 2 is an exploded perspective view illustrating an internal configuration of the universal-battery-outer-shape wirelessly chargeable battery 101A.

The universal-battery-outer-shape wirelessly chargeable battery 101A includes a secondary battery 1, a wireless charging circuit connected to the secondary battery 1, a housing body that has an outer shape equivalent to the outer shape of a universal battery and accommodates the secondary battery 1 and the wireless charging circuit, and a positive terminal 711 and a negative terminal 72 that are electrically connected to the secondary battery 1 and are provided at positions corresponding to the positions of a positive terminal and a negative terminal, respectively, of the universal battery. A positive electrode 71 is electrically connected to the positive terminal 711. In FIG. 1, a second outer casing member 22 is covered with a first outer casing member 21. The first outer casing member 21 and the second outer casing member 22 configure a "housing body" according to the present disclosure.

The second outer casing member 22 has openings 2212, and light guide members 590 are provided inside the openings 2212.

The first outer casing member 21 includes a wall 211, two walls 212, a wall 213, and a wall 214.

The wall 211 has a shape extending in an X direction and a Y direction that are orthogonal to each other. The wall 211 is a rectangular flat plate shape in a plan view. The wall 211 is long in the X direction and short in the Y direction.

The two walls 212 each have a shape extending in a direction orthogonal to the flat plate surface of the wall 211. The two walls 212 each have a shape extending along a side along the X direction of the wall 211. The two walls 212 are arranged on corresponding two sides of the wall 211.

The wall 213 and the wall 214 each have a shape extending in a direction orthogonal to the flat plate surface of the wall 211. The wall 213 and the wall 214 each have a shape extending along an end side along the Y direction of the wall 211. The wall 213 is arranged on one end of the wall 211 in the Y direction, and the wall 214 is arranged on the other end of the wall 211 in the Y direction. The wall 213 and the wall 214 are connected to the two walls 212.

The second outer casing member 22 includes a wall 221, a wall 223, and a wall 224.

The wall 221 has a shape including a flat plate part and an arc-shaped part. The arc-shaped part has a shape in which a surface curves at a predetermined curvature radius, and the cross-section shape of the arc-shaped part (in FIG. 1 and other figures, the cross-section on a YZ plane) is a hemispherical shape. The flat plate part is connected to sides of the arc-shaped part so as to extend in the Z direction. Thus, the cross-section of the wall 221 is U-shaped. The wall 221 is long in the X direction and short in the Y direction.

The wall 223 is arranged on one end of the wall 221 in the X direction. The wall 223 has a flat plate shape parallel to the YZ plane. The wall 223 is arranged on the one end of the wall 221 in the X direction and is connected to the wall 221. The wall 224 has a flat plate shape parallel to the YZ plane. The wall 224 is arranged on the other end of the wall 221 in the X direction and is connected to the wall 221.

With this arrangement, the second outer casing member 22 has a space 220 surrounded by the wall 221, the wall 223, and the wall 224. That is, the second outer casing member 22 has substantially a semi-tubular shape, and the space 220 has substantially a semi-cylindrical shape in which a semi-cylinder and a substantial cuboid are connected.

As described above, the first outer casing member 21 and the second outer casing member 22 have different shapes, and the outer shape of the first outer casing member 21 and the outer shape of the second outer casing member 22 are different.

The first outer casing member 21 is engaged with the second outer casing member 22 so that a cylindrical outer casing is formed. Thus, a space 210 of the first outer casing member 21 is connected to the space 220 of the second outer casing member 22, so that an inner space of the outer casing is formed. The inner space of the outer casing has a shape in which the semi-cylinder and the substantial cuboid are connected and integrated with each other.

With this arrangement, part of the cylindrical outer casing in the circumferential direction forms a flat surface composed of the wall 211 of the first outer casing member 21, and the other part of the cylindrical outer casing in the circumferential direction forms a curved surface composed of the wall 221 of the second outer casing member 22. Thus, a user is able to easily distinguish between the first outer casing member 21 and the second outer casing member 22 and easily understand the orientation of the universal-battery-outer-shape wirelessly chargeable battery 101A.

The engagement mentioned above is implemented by causing engagement protrusions 2121 formed at the walls 212 of the first outer casing member 21 to be engaged in engagement grooves 2211 formed at the wall 221 of the second outer casing member 22. Thus, the first outer casing member 21 and the second outer casing member 22 configure a detachably engaged shape.

For example, the outer shape of the outer casing is substantially the same as the shape of an AA dry battery and has substantially the same size. The dimensions of the outer shape are merely an example, and the outer shape of the outer casing may have substantially the same shape as other types of dry batteries.

A power receiving coil member 30, a magnetic sheet 40, a circuit substrate 550, the secondary battery 1, the positive electrode 71, the negative terminal 72, a substrate fixing member 500, and the light guide member 590 are arranged in the inner space of the outer casing. The magnetic sheet 40 corresponds to a "magnetic layer" according to the present disclosure.

The power receiving coil member 30 has a flat film shape having a main surface. The power receiving coil member 30 includes a power receiving coil 31 and a base member 32. The base member 32 has a flat film shape having a main surface and has insulating characteristics. For example, the power receiving coil member 30 is arranged in contact with the wall 211 of the first outer casing member 21.

The power receiving coil 31 is implemented by a linear conductor of a winding shape. The power receiving coil 31 has a coil opening having a predetermined area at the center of the winding shape. The power receiving coil 31 is arranged at the base member 32. A face at which the winding shape of the power receiving coil 31 is formed is parallel to the main surface of the base member 32.

The power receiving coil member 30 is arranged next to the first outer casing member 21. When the power receiving coil member 30 is arranged close to the first outer casing member 21, the main surface of the power receiving coil member 30 is substantially parallel to the wall 211 of the first outer casing member 21. With this arrangement, as described later, when a power transmitting coil is arranged on the first outer casing member 21 side, the power receiving coil 31 and the power transmitting coil (a power transmitting coil 900 described later) face each other.

As described above, the power receiving coil 31 is located closer to the outer surface of the housing body than the secondary battery 1 is, and the magnetic sheet 40 is provided between the power receiving coil 31 and the secondary battery 1. With this arrangement, the power receiving coil 31 and the power transmitting coil 900 are made to face each other. Thus, with this arrangement, the universal-battery-outer-shape wirelessly chargeable battery 101A is able to receive power at high efficiency.

Desirably, the area of the main surface of the base member 32 is substantially the same as the area of a face of the wall 211 of the first outer casing member 21 closer to the space 210, and the power receiving coil 31 is arranged substantially along the four sides of the main surface of the base member 32 and close to the four sides. That is, the flat surface area of the power receiving coil member 30 is substantially the same as the flat surface area (are of a flat surface) of the wall 211 of the first outer casing member 21. With the use of the power receiving coil 31 and the base member 32 having the arrangement described above, a higher power receiving efficiency can be achieved than the case where the power receiving coil 31 and the base member 32 having smaller sizes are used. For example, the outer shape of the power receiving coil 31 may be equal to or more than half the area of the wall 211 of the first outer casing member 21. The outer shape of the power receiving coil 31 may be adjusted appropriately according to the specifications of the universal-battery-outer-shape wirelessly chargeable battery 101A. However, for example, assuming that the universal-battery-outer-shape wirelessly chargeable battery 101A has the shape of an AA dry battery, a predetermined power receiving performance can be achieved in the case where the outer shape of the power receiving coil 31 is equal to or more than half the area of the wall 211 of the first outer casing member 21.

The magnetic sheet 40 has a flat film shape having a main surface. The magnetic sheet 40 is arranged next to the power receiving coil member 30. The magnetic sheet 40 is arranged opposite the wall 211 of the first outer casing member 21 relative to the power receiving coil member 30. The magnetic sheet 40 is arranged in contact with the power receiving coil member 30. Desirably, the area (area of the main surface) of the magnetic sheet 40 is equal to or more than the flat surface area of the power receiving coil 31. With the arrangement of the magnetic sheet 40 described above, a closed magnetic path can be formed in the case where a power transmitting coil is arranged relative to the power receiving coil member 30, as described above. Thus, with this structure, the universal-battery-outer-shape wirelessly chargeable battery 101A is able to receive power with a higher efficiency.

The circuit substrate 550 has a flat plate shape. The circuit substrate 550 is implemented by forming a conductor pattern on a substrate made of an insulating material (for example, an insulating resin). Various circuit elements that implement a circuit of a power receiving system, which will be described later, are mounted on the circuit substrate 550.

The circuit substrate 550 is arranged next to the magnetic sheet 40 with the substrate fixing member 500 interposed therebetween. The circuit substrate 550 is arranged opposite the power receiving coil member 30 relative to the magnetic sheet 40. The circuit substrate 550 is arranged in such a manner that the flat plate surface of the circuit substrate 550 is substantially in parallel to the wall 211 of the first outer casing member 21. For example, the circuit substrate 550 is fixed to the second outer casing member 22 by the substrate fixing member 500.

The secondary battery 1 has a cylindrical shape. The secondary battery 1 is, for example, a lithium-ion battery. However, the secondary battery 1 is not necessarily a lithium-ion battery and may be other types of secondary batteries. Furthermore, as described later, the shape of the secondary battery 1 is not necessarily a cylindrical shape and may be any shape fitting in the second outer casing member 22.

The secondary battery 1 is arranged next to the circuit substrate 550. The secondary battery 1 is arranged opposite the magnetic sheet 40 relative to the circuit substrate 550. The secondary battery 1 is arranged in such a manner that the direction in which the cylindrical shape extends is parallel to the longitudinal direction of the second outer casing member 22 (X direction in FIG. 2 and other figures). The secondary battery 1 arranged in this state is housed in the space 220 of the second outer casing member 22.

A wiring 600 is provided at the secondary battery 1. The wiring 600 is connected to the circuit substrate 550.

Each of the positive electrode 71 and the negative terminal 72 is a flat-plate conductor. The positive electrode 71 is attached to the wall 223 of the second outer casing member 22. A wiring 701 is connected to the positive electrode 71. The wiring 701 is connected to the circuit substrate 550.

The negative terminal 72 is connected to the wall 224 of the second outer casing member 22. The negative terminal 72 is exposed to the outside of the wall 224 of the second outer casing member 22. A wiring 702 is connected to the negative terminal 72. The wiring 702 is connected to the circuit substrate 550.

The positive terminal 711 has a shape having a protrusion. The positive terminal 711 is in contact with the positive electrode 71. The protruding part of the positive terminal 711 is exposed to the outside of the wall 223.

The protruding part of the positive terminal 711 is positive when the universal-battery-outer-shape wirelessly chargeable battery 101A is used as a chargeable battery. Furthermore, the negative terminal 72 described above is negative in the case where the universal-battery-outer-shape wirelessly chargeable battery 101A is used as a chargeable battery.

The light guide member 590 is in contact with the openings 2212 formed in the wall 221 of the second outer casing member 22. The light guide member 590 guides light emitted from a light-emitting element (for example, a light-emitting diode (LED)) mounted on the circuit substrate 550. The light guided by the light guide member 590 is output through the openings 2212 to the outside.

Figure 3:
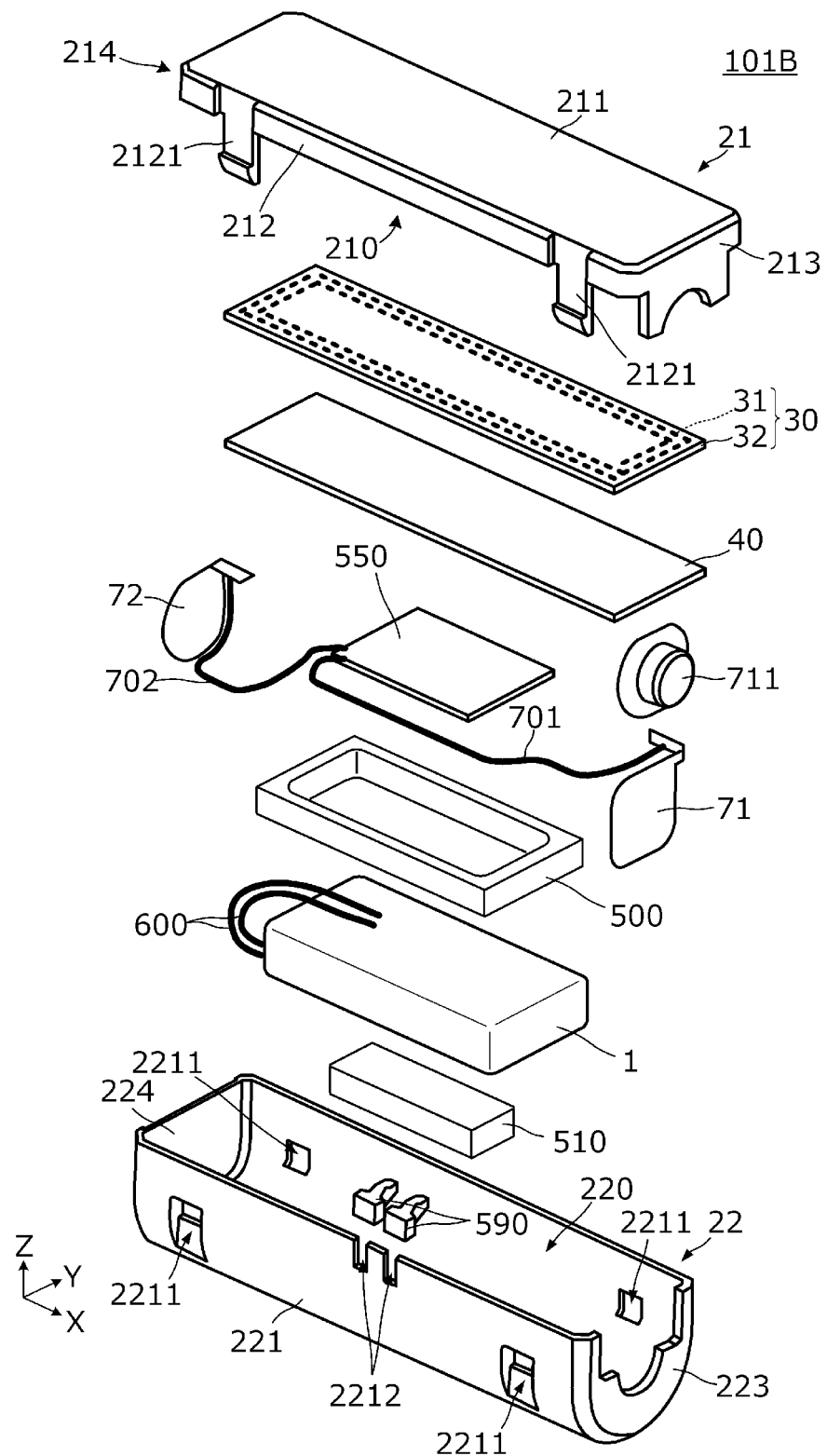
FIG. 3 is an exploded perspective view of a universal-battery-outer-shape wirelessly chargeable battery according to the first embodiment.

FIG. 3 is an exploded perspective view of a universal-battery-outer-shape wirelessly chargeable battery 101B according to the first embodiment. The universal-battery-outer-shape wireless rechargeable battery 101B is different from the universal-battery-outer-shape wirelessly chargeable battery 101A illustrated in FIG. 2 in the shapes of the secondary battery 1 and the substrate fixing member 500 that are built inside the universal-battery-outer-shape wirelessly chargeable battery 101B. The universal-battery-outer-shape wirelessly chargeable battery 101B is also different from the universal-battery-outer-shape wirelessly chargeable battery 101A in that the universal-battery-outer-shape wirelessly chargeable battery 101B includes a secondary battery cushion member 510. The outer shape of the secondary battery 1 provided in the universal-battery-outer-shape wirelessly chargeable battery 101B is a cuboid shape. The secondary battery cushion member 510 is provided between the secondary battery 1 and the inner bottom surface of the second outer casing member 22. The secondary battery 1 is held at the second outer casing member 22 with the secondary battery cushion member 510 interposed therebetween. Thus, the impact received by the secondary battery 1 when the universal-battery-outer-shape wirelessly chargeable battery 101B receives acceleration or vibrations, is moderated.

The substrate fixing member 500 has a frame shape, and the circuit substrate 550 is housed in the inner space of the substrate fixing member 500. The substrate fixing member 500 also has a function for holding a peripheral part of the upper surface of the secondary battery 1 in such a manner that the impact is absorbed. The secondary battery cushion member 510 mainly holds the central part of the bottom surface of the secondary battery 1 in such a manner that the impact is absorbed. Thus, the impact received by the secondary battery 1 can be reduced more effectively by using the secondary battery cushion member 510 and the substrate fixing member 500. The secondary battery cushion member 510 and the substrate fixing member 500 correspond to a "cushion layer" according to the present disclosure.

As described above, the universal-battery-outer-shape wirelessly chargeable battery 101A and the universal-battery-outer-shape wirelessly chargeable battery 101B are different in the shape of outer casings. Thus, a user is able to easily recognize the orientation of the universal-battery-outer-shape wirelessly chargeable battery 101A by appearance and feel.

Furthermore, with the configuration described above, the magnetic sheet 40 is arranged between the power receiving coil member 30 and the circuit substrate 550. Thus, leakage of a coupling magnetic field or a coupling electromagnetic field between the power transmitting coil 900 and the power receiving coil 31 of the power receiving coil member 30 toward the circuit substrate 550 and the secondary battery 1 is negligible. Therefore, magnetic flux is interlinked with the conductor part of the circuit substrate 550 and the housing of the secondary battery 1, and generation of an eddy current can be reduced. Thus, loss such as heat generation caused by an eddy current can be reduced.

Figure 4A:
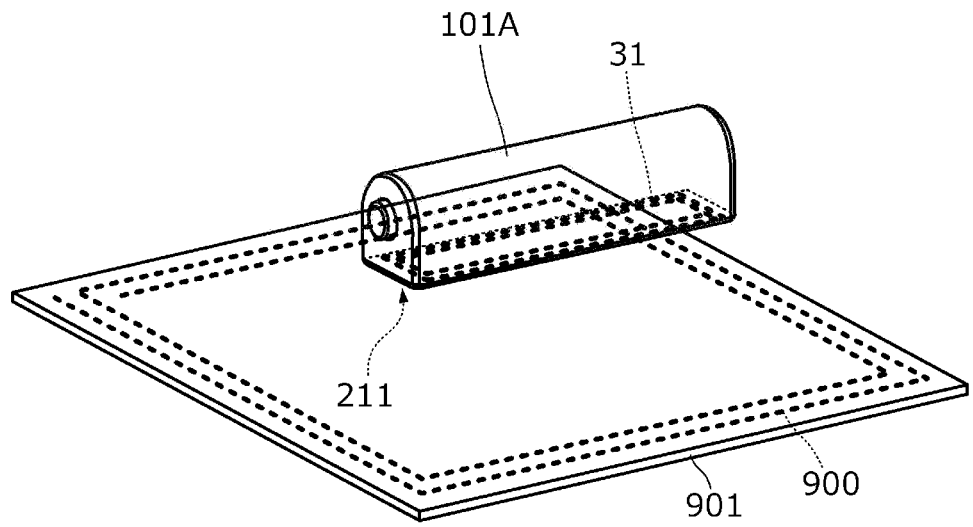
FIGS. 4A and 4B are diagrams each illustrating the positional relationship between a power transmission plate and the universal-battery-outer-shape wirelessly chargeable battery.
Figure 4B:
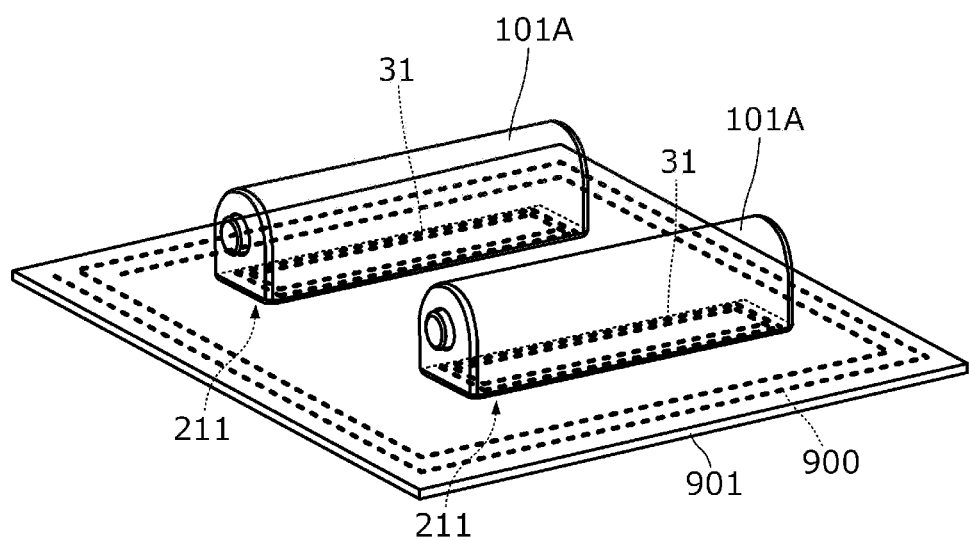

FIGS. 4A and 4B are diagrams each illustrating the positional relationship between a power transmission plate 901 and the universal-battery-outer-shape wirelessly chargeable battery 101A. A power transmission device includes the power transmitting coil 900 and the power transmission plate 901. The power transmitting coil 900 includes a linear conductor pattern having a winding shape. The power transmitting coil 900 is formed on the power transmission plate 901. The power transmitting coil 900 is arranged in such a manner that an opening face of the winding shape is substantially parallel to a surface of the power transmission plate 901.

In the case where power is supplied to the universal-battery-outer-shape wirelessly chargeable battery 101A as a single unit, the universal-battery-outer-shape wirelessly chargeable battery 101A is arranged close on the power transmission plate 901 as illustrated in FIG. 4A. Alternatively, the universal-battery-outer-shape wirelessly chargeable battery 101A is placed on the power transmission plate 901 as illustrated in FIG. 4B. In the example of FIG. 4B, two universal-battery-outer-shape wirelessly chargeable batteries 101A are placed at the same time. In each of FIGS. 4A and 4B, when the power transmission plate 901 is viewed in plan, a coil opening of the power receiving coil 31 of the universal-battery-outer-shape wireless rechargeable battery 101A and a coil opening of the power transmitting coil 900 on the power transmission plate 901 overlap.

Figure 5A:
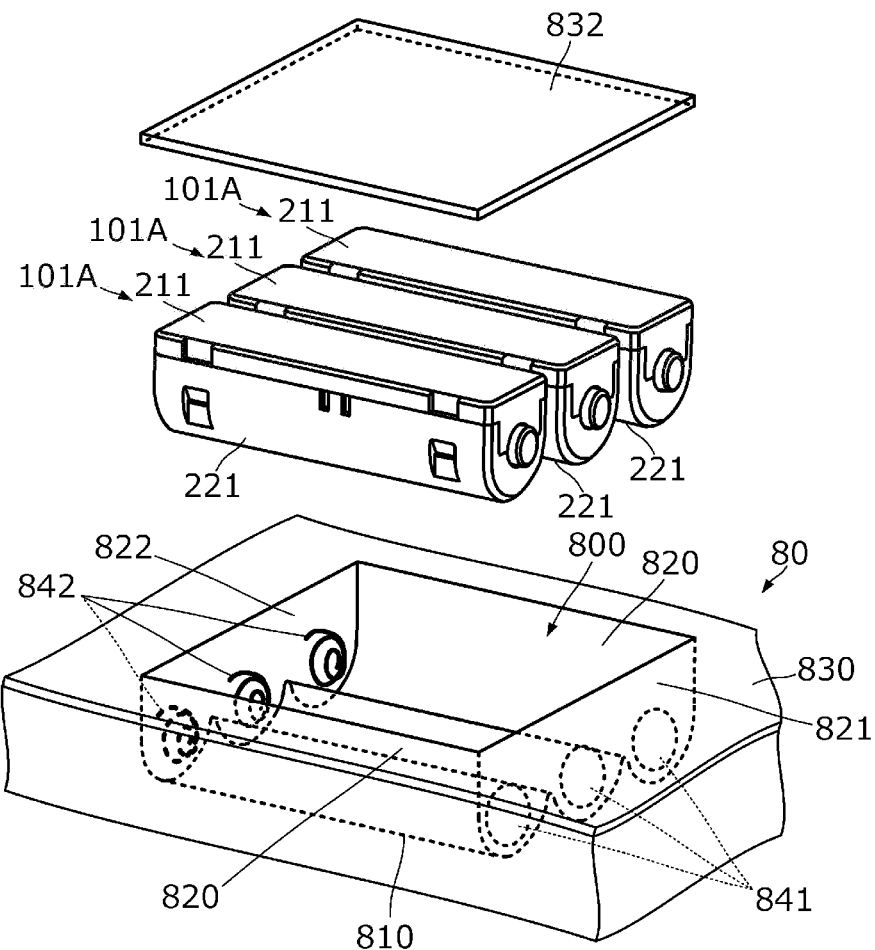
FIG. 5A is an exploded perspective view of a state in which the universal-battery-outer-shape wirelessly chargeable battery is attached to an electronic device.
Figure 5B:
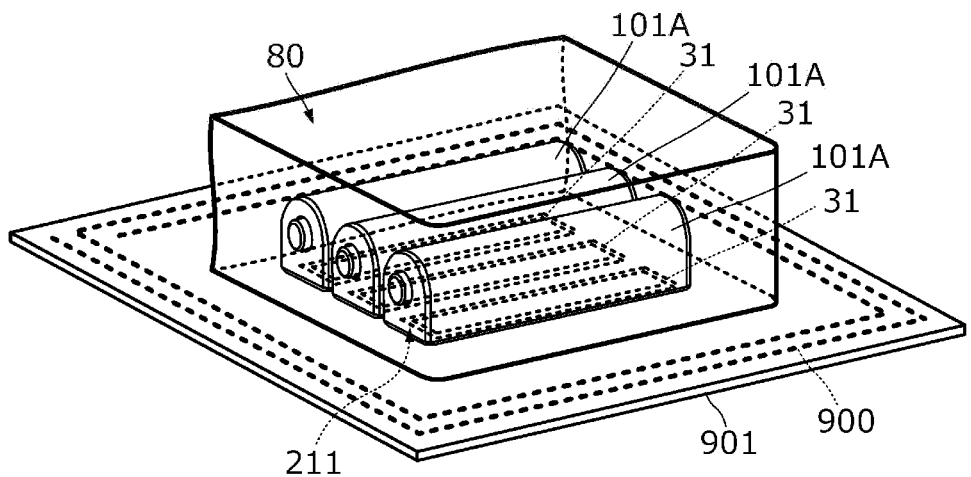
FIG. 5B is an external perspective view illustrating a state in which the universal-battery-outer-shape wirelessly chargeable battery attached to the electronic device is charged.

FIG. 5A is an exploded perspective view of a state in which the universal-battery-outer-shape wirelessly chargeable battery 101A is attached to an electronic device. FIG. 5B is an external perspective view illustrating a state in which the universal-battery-outer-shape wirelessly chargeable battery 101A attached to the electronic device is charged. As illustrated in FIG. 5B, an electronic device 80 is arranged on the surface of the power transmission plate 901 in such a manner that the bottom face of the electronic device 80 is in contact with the surface of the power transmission plate 901.

The electronic device 80 includes a battery holder 800. The battery holder 800 is implemented by a recessed part provided at a wall 830 of the casing of the electronic device 80. The battery holder 800 includes a bottom wall 810, a side wall 820, a side wall 821, a side wall 822, and a lid 832.

The universal-battery-outer-shape wirelessly chargeable battery 101A is housed in the battery holder 800. In this embodiment, three universal-battery-outer-shape wirelessly chargeable batteries 101A are housed in the battery holder 800.

When the universal-battery-outer-shape wirelessly chargeable batteries 101A are housed in the battery holder 800, which has the configuration described above, in such a manner that the walls 221 are close to the bottom wall 810, the walls 221 of the universal-battery-outer-shape wirelessly chargeable batteries 101A are parallel to the bottom wall 810 and the side wall 820 of the battery holder 800. That is, the universal-battery-outer-shape wirelessly chargeable batteries 101A are housed in the battery holder 800 without any gap.

As described above, when the universal-battery-outer-shape wirelessly chargeable batteries 101A are housed in the battery holder 800, the positive terminals 711 of the universal-battery-outer-shape wirelessly chargeable batteries 101A are made in contact with positive terminal electrodes 841 of the electronic device 80, and the negative terminals 72 of the universal-battery-outer-shape wirelessly chargeable batteries 101A are made in contact with negative terminal electrodes 842 of the electronic device 80.

Furthermore, with the configuration described above, the universal-battery-outer-shape wirelessly chargeable batteries 101A are housed in the battery holder 800 of the electronic device 80 in such a manner that the power receiving coil members 30 are close to the outside of the electronic device 80. Thus, the universal-battery-outer-shape wirelessly chargeable batteries 101A that are attached to the electronic device 80 are able to receive power supply from the power transmission device.

Figure 6:
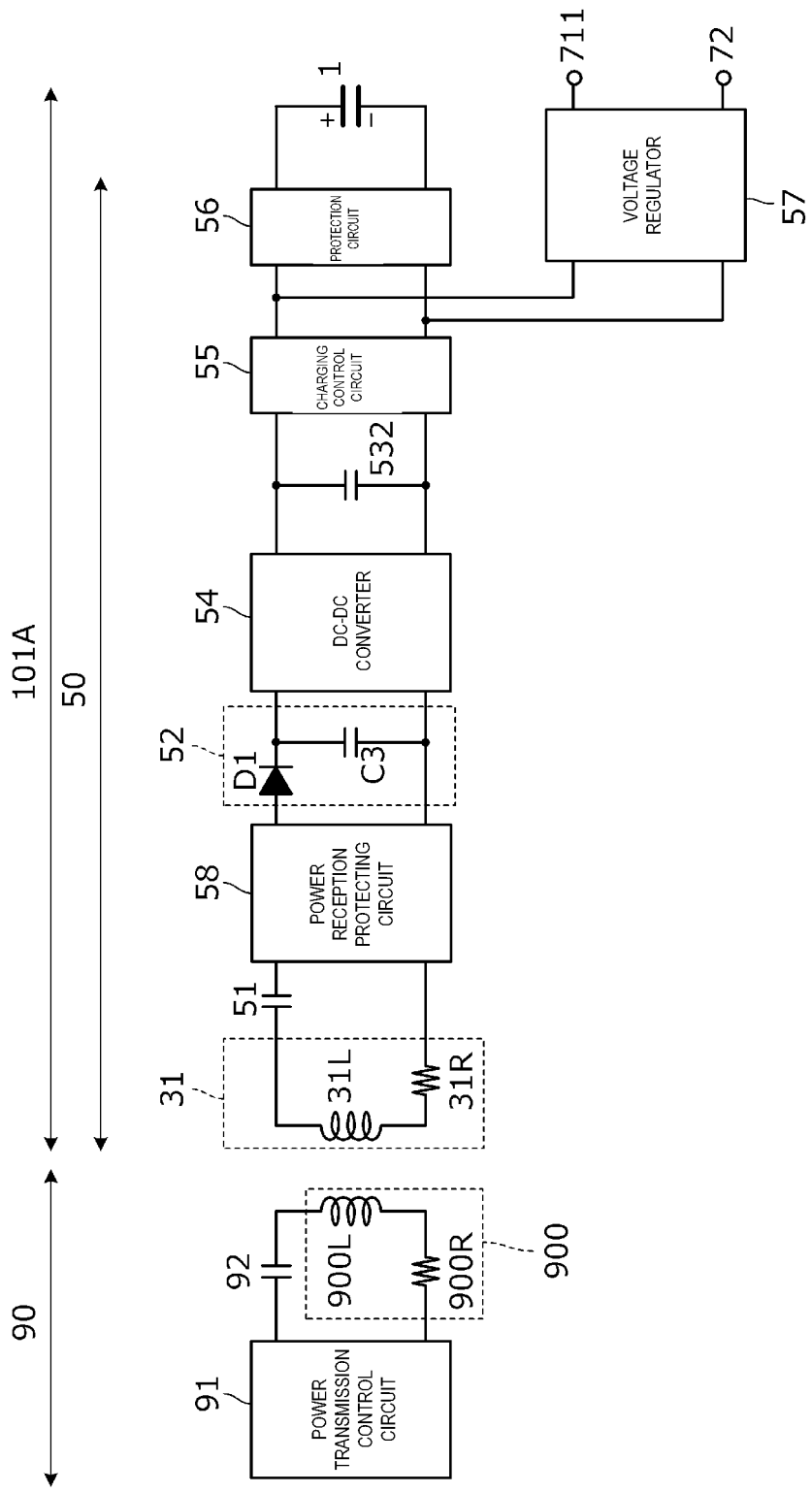
FIG. 6 is a circuit diagram of the universal-battery-outer-shape wirelessly chargeable battery and other elements.

FIG. 6 is a circuit diagram of the universal-battery-outer-shape wirelessly chargeable battery 101A and other elements. In FIG. 6, a circuit of a power transmission device 90 is also illustrated.

The universal-battery-outer-shape wirelessly chargeable battery 101A includes the secondary battery 1 and a wireless charging circuit 50 that is connected to the secondary battery 1. The wireless charging circuit 50 includes the power receiving coil 31 that receives a power transmission magnetic field or a power transmission electromagnetic field, a power reception protecting circuit 58, a rectifier circuit 52, a DC-DC converter 54 that converts a rectification and smoothing output voltage output from the rectifier circuit 52 to generate a charging voltage, a charging control circuit 55 that receives the voltage output from the DC-DC converter 54 and performs charging control for the secondary battery 1, a protection circuit 56 that protects the secondary battery 1, and a voltage regulator 57 that converts the current of the secondary battery 1 into an output voltage of a universal battery.

The power receiving coil 31 is expressed by an inductor 31L and an equivalent resistor 31R. A resonant capacitor 51 is connected to the power receiving coil 31, and the resonant capacitor 51 and the power receiving coil 31 configure a resonant circuit. The power reception protecting circuit 58 restricts output to the rectifier circuit 52 in the case where the received voltage exceeds a predetermined voltage range. The rectifier circuit 52 includes a smoothing capacitor C3. The rectifier circuit 52 rectifies the current input from the power reception protecting circuit 58, and outputs the rectified current to the DC-DC converter 54. The DC-DC converter 54 corresponds to a "first voltage conversion circuit" according to the present disclosure.

A capacitor 532 is connected to output of the DC-DC converter 54. For example, the voltage regulator 57 is an LDO (Low Dropout regulator) and is a linear regulator including a MOS-FET and an operational amplifier. The voltage regulator 57 stabilizes the voltage of the secondary battery 1 and outputs the stabilized voltage to the positive terminal 711 and the negative terminal 72. The voltage regulator 57 corresponds to a "second voltage conversion circuit" according to the present disclosure.

The power transmission device 90 includes a power transmission control circuit 91, the power transmitting coil 900, and a resonant capacitor 92. The power transmitting coil 900 is expressed by an inductor 900L and an equivalent resistor 900R. The power transmitting coil 900 and the resonant capacitor 92 configure a resonant circuit resonating in a power transmission frequency band. For example, the resonant circuit resonates in a frequency band of 6.78 MHz or 13.56 MHz. These frequency bands are ISM (industrial, scientific and medical) bands and are advantageous in design regarding EMC (electromagnetic compatibility). Coupling between the resonance on the power transmission device side and the resonant circuit including the power receiving coil 31 and the resonant capacitor 51 on the universal-battery-outer-shape wirelessly chargeable battery 101A side causes magnetic field resonance.

The resonant circuit including the power receiving coil 31 and the resonant capacitor 51 resonates in a frequency band of an electromagnetic field or a magnetic field received from the power transmission device 90, for example, a frequency band of 6.78 MHz or 13.56 MHz. The power receiving coil 31 outputs received power to the rectifier circuit 52. The power reception protecting circuit 58 rectifies an AC received voltage into a DC voltage, and stops power reception at the DC-DC converter 54 in the case where the received voltage exceeds a predetermined voltage range. The DC-DC converter 54 performs voltage conversion and outputs the converted voltage to the charging control circuit 55. The capacitor 532 smooths the voltage output from the DC-DC converter 54. The charging control circuit 55 charges the secondary battery 1 using a received DC voltage that has been rectified and converted from AC voltage. The voltage regulator 57 converts the voltage output from the secondary battery 1 and outputs the converted voltage to between the positive terminal 711 and the negative terminal 72.

The protection circuit 56 performs overcurrent protection at the time of charging and discharging the secondary battery 1 and overvoltage input protection to the secondary battery 1. The protection circuit 56 also performs overheat protection in accordance with the resistance of an NTC thermistor. For example, in the case where a charging/discharging current to the secondary battery 1 exceeds a specified value, the protection circuit 56 restricts the current. Furthermore, in the case where the voltage of the secondary battery 1 exceeds a predetermined value, the protection circuit 56 restricts a charging current. Moreover, in the case where the temperature of the secondary battery 1 or the ambient temperature is outside a predetermined value range, the protection circuit 56 reduces charging or discharging.

Figure 7:
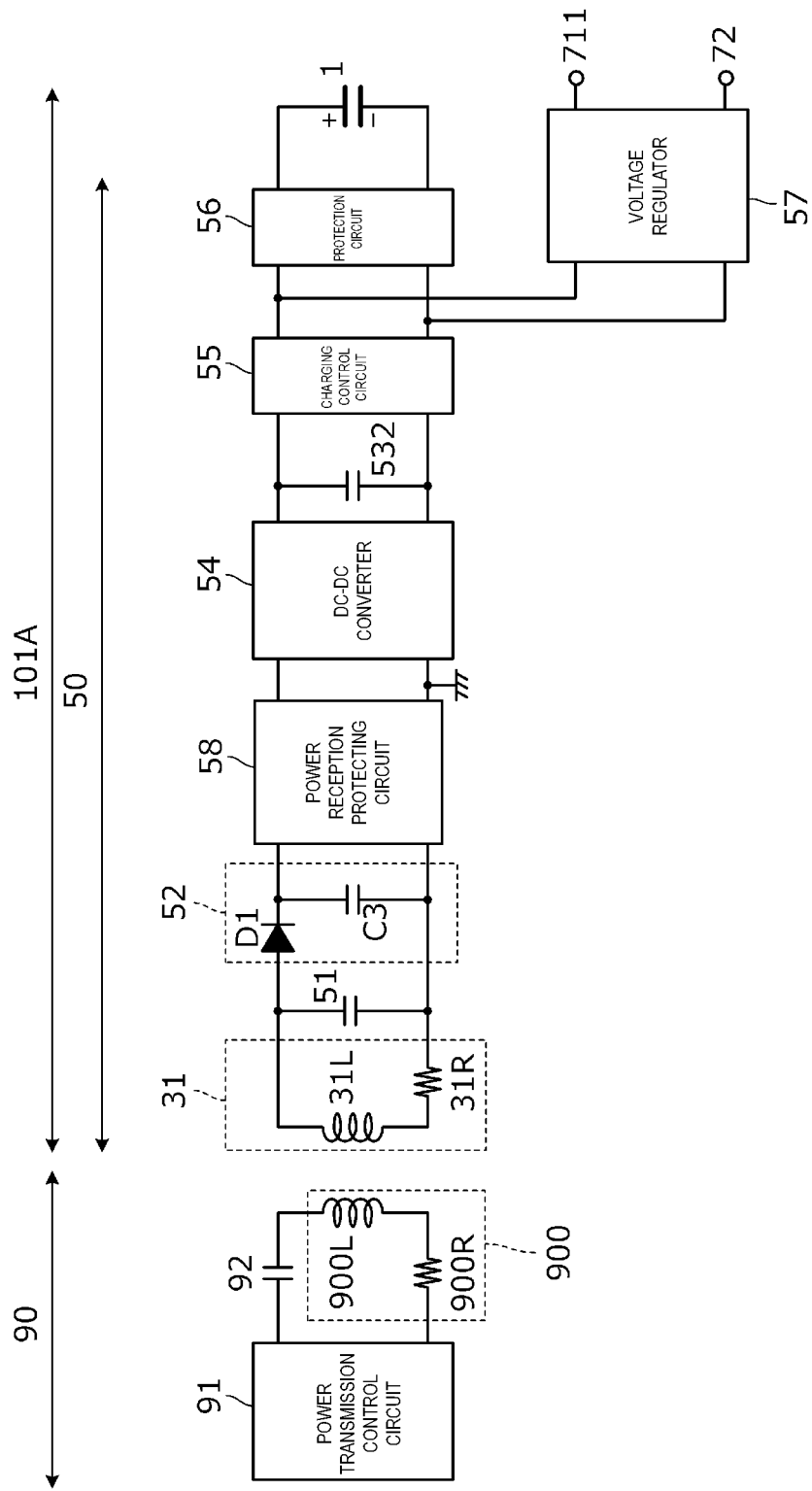
FIG. 7 is another circuit diagram of the universal-battery-outer-shape wirelessly chargeable battery and other elements.

FIG. 7 is another circuit diagram of the universal-battery-outer-shape wirelessly chargeable battery 101A and other elements. The order of connection between the power reception protecting circuit 58 and the rectifier circuit 52 of the universal-battery-outer-shape wirelessly chargeable battery 101A illustrated in FIG. 7 is opposite the order of connection between the power reception protecting circuit 58 and the rectifier circuit 52 of the universal-battery-outer-shape wirelessly chargeable battery 101A illustrated in FIG. 6. Furthermore, the resonant capacitor 51, which configures a resonant circuit, together with the power receiving coil 31, is connected in parallel to the power receiving coil 31. The other features of the universal-battery-outer-shape wirelessly chargeable battery 101A illustrated in FIG. 7 are similar to those of the universal-battery-outer-shape wirelessly chargeable battery 101A illustrated in FIG. 6.

FIGS. 8A, 8B, 8C, and 8D are circuit diagrams illustrating specific examples of the power reception protecting circuit 58 illustrated in FIGS. 6 and 7. In FIGS. 8A, 8B, 8C, and 8D, the power reception protecting circuit 58 and the rectifier circuit 52 are illustrated so that connection between the rectifier circuit 52 and the power reception protecting circuit 58 is clarified.

Figure 8A:
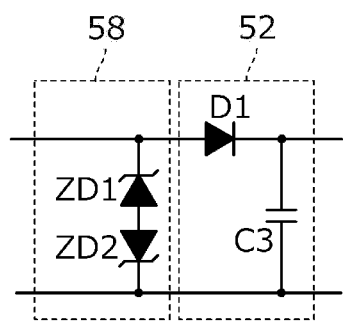
FIGS. 8A, 8B, 8C, and 8D are circuit diagrams illustrating specific examples of a power reception protecting circuit.

In the example illustrated in FIG. 8A, a diode D1 and a capacitor C3 configure a rectification and smoothing circuit. When the received voltage exceeds the Zener voltage of Zener diodes ZD1 and ZD2, both ends of a connection circuit including the Zener diodes ZD1 and ZD2 are electrically connected, and the received voltage is restricted to the Zener voltage. This circuit configuration is used as the power reception protecting circuit 58 illustrated in FIG. 6.

Figure 8B:
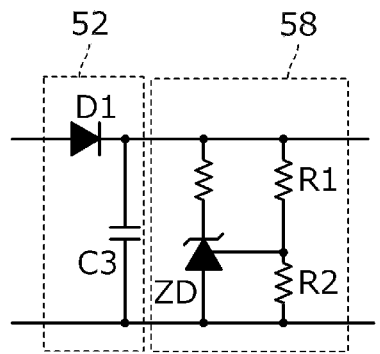

In the example illustrated in FIG. 8B, the diode D1 and the capacitor C3 configure a rectification and smoothing circuit. When the divided voltage of resistors R1 and R2 exceeds the Zener voltage of a Zener diode ZD, the Zener diode ZD is electrically connected, and the received voltage is restricted by a series circuit including the Zener diode and the resistors. This circuit configuration is used as the power reception protecting circuit 58 illustrated in FIG. 7.

Figure 8C:
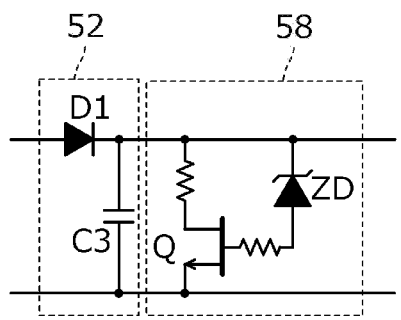

In the example illustrated in FIG. 8C, the diode D1 and the capacitor C3 configure a rectification and smoothing circuit. When the rectification and smoothing voltage exceeds the Zener voltage of the Zener diode ZD, an FET Q is electrically connected, and the received voltage is restricted by a series circuit including the FET Q and a resistor. This circuit configuration is used as the power reception protecting circuit 58 illustrated in FIG. 7.

Figure 8D:
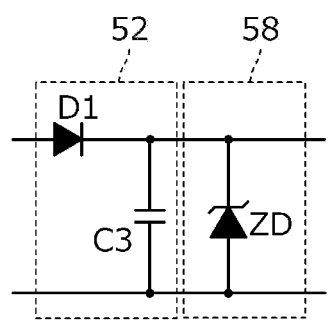

In the example illustrated in FIG. 8D, the diode D1 and the capacitor C3 configure a rectification and smoothing circuit. When the rectification and smoothing voltage exceeds the Zener voltage of the Zener diode ZD, the Zener diode ZD is electrically connected, and the received voltage is restricted to the Zener voltage. This circuit configuration is used as the power reception protecting circuit 58 illustrated in FIG. 7.

As described above, the power reception protecting circuit 58 protects the DC-DC converter 54 (first voltage conversion circuit) in the case where the received voltage exceeds a predetermined voltage range.

Figure 9:
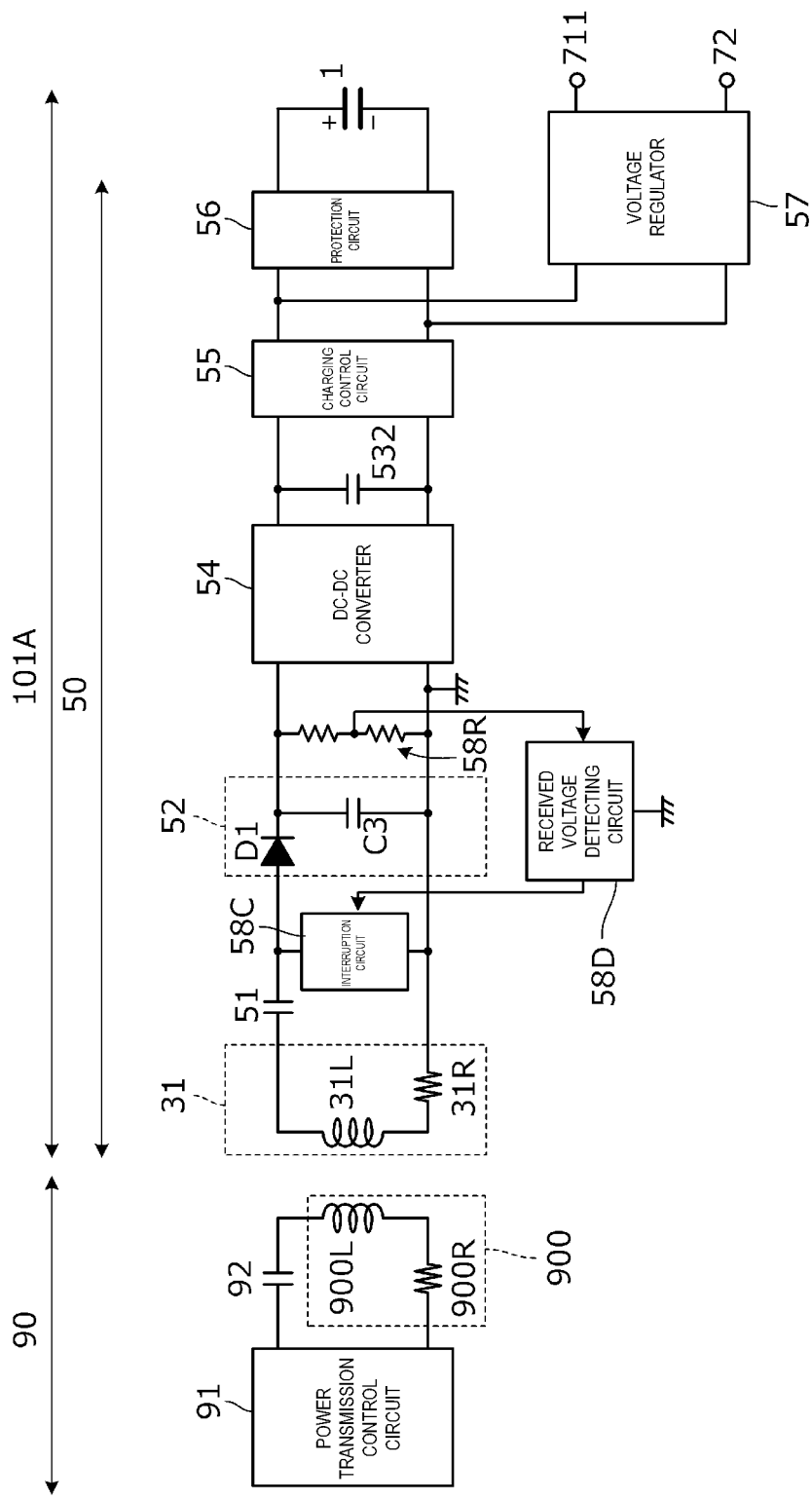
FIG. 9 is another circuit diagram of the universal-battery-outer-shape wirelessly chargeable battery and other elements.

FIG. 9 is another circuit diagram of the universal-battery-outer-shape wirelessly chargeable battery 101A and other elements. Schematically, the universal-battery-outer-shape wirelessly chargeable battery 101A illustrated in FIG. 9 includes an interruption circuit 58C as a derived example of the power reception protecting circuit 58 of the universal-battery-outer-shape wirelessly chargeable battery 101A illustrated in FIG. 6.

The universal-battery-outer-shape wirelessly chargeable battery 101A includes the secondary battery 1 and the wireless charging circuit 50 that is connected to the secondary battery 1. The wireless charging circuit 50 includes the power receiving coil 31 that receives a power transmission magnetic field or a power transmission electromagnetic field, the rectifier circuit 52 that rectifies an induced current of the power receiving coil 31, the interruption circuit 58C that stops power reception at the rectifier circuit 52 in the case where the received voltage exceeds a predetermined voltage range, a resistor dividing circuit 58R, a received voltage detecting circuit 58D, the DC-DC converter 54 that converts the voltage output from the rectifier circuit 52 to generate a charging voltage, the charging control circuit 55 that receives the voltage output from the DC-DC converter 54 and performs charging control for the secondary battery 1, the protection circuit 56 that protects the secondary battery 1, and the voltage regulator 57 that converts the current of the secondary battery 1 into an output voltage of a universal battery. The interruption circuit 58C, the received voltage detecting circuit 58D, and the resistor dividing circuit 58R configure a power reception protecting circuit. Features other than this configuration feature of the power reception protecting circuit are similar to those of the universal-battery-outer-shape wirelessly chargeable battery 101A illustrated in FIG. 6.

When the received voltage detecting circuit 58D detects that the voltage output from the resistor dividing circuit 58R exceeds a predetermined value, the received voltage detecting circuit 58D outputs a detection signal to the interruption circuit 58C. When receiving the detection signal from the received voltage detecting circuit 58D, the interruption circuit 58C stops power reception at the rectifier circuit 52.

Figure 10A:
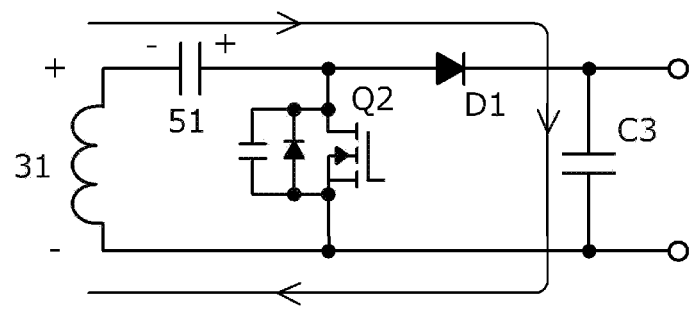
FIGS. 10A and 10B are diagrams for explaining an operation of an interruption circuit in FIG. 9 at the time of normal power reception.
Figure 10B:
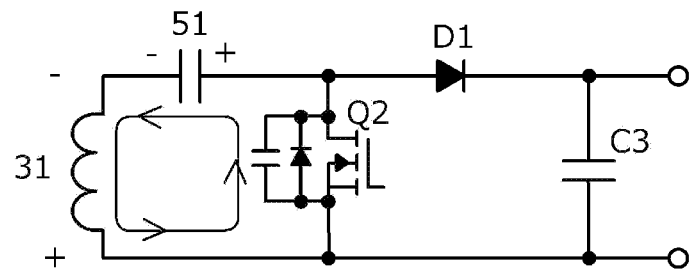

FIGS. 10A and 10B are diagrams for explaining an operation of the interruption circuit 58C at the time of normal power reception. At the time of normal power reception, an FET Q2 of the interruption circuit 58C is turned off.

As illustrated in FIG. 10A, when a first end of the power receiving coil 31 near the capacitor 51 becomes positive, current flows through a path in the order of the power receiving coil 31, the capacitor 51, the diode D1, and the capacitor C3. In this case, a voltage obtained by adding the voltage charged in the resonant capacitor 51 to the voltage induced by the power receiving coil 31 is charged into the capacitor C3. That is, this voltage is supplied to the rectifier circuit 52.

As illustrated in FIG. 10B, when a second end of the power receiving coil 31 is positive, current flows from the power receiving coil 31, through a body diode of the FET Q2, to the capacitor 51. Thus, the capacitor 51 is charged.

At the time of normal power reception, the state illustrated in FIG. 10A and the state illustrated in FIG. 10B are repeated alternately, and the received voltage is output to the rectifier circuit 52.

Figure 11A:
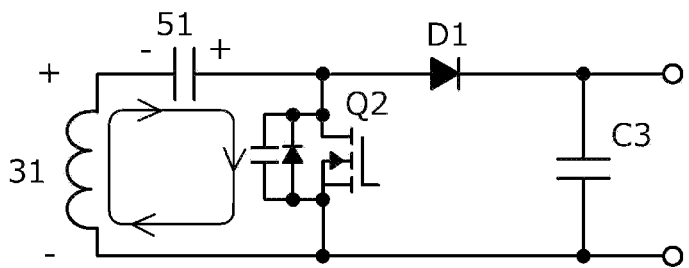
FIGS. 11A and 11B are diagrams for explaining an operation of the interruption circuit performed when a received voltage exceeds a specified value.
Figure 11B:
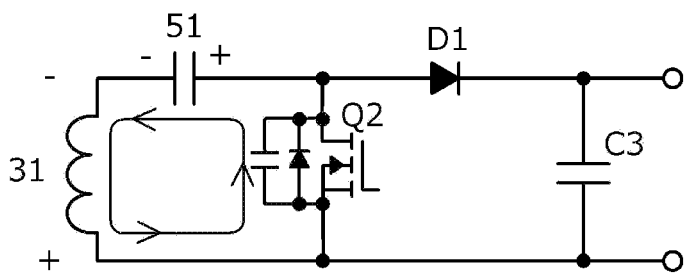

FIGS. 11A and 11B are diagrams for explaining an operation of the interruption circuit 58C in the case where the received voltage exceeds a specified value. The FET Q2 is turned on in accordance with the detection signal output from the received voltage detecting circuit 58D illustrated in FIG. 9.

When the voltage is induced by the power receiving coil 31 and the first end of the power receiving coil 31 becomes positive, as illustrated in FIG. 11A, current flows through a path in the order of the power receiving coil 31, the resonant capacitor 51, and the FET Q2. As illustrated in FIG. 11B, in the case where the second end of the power receiving coil 31 is positive, current flows from the power receiving coil 31, through the body diode of the FET Q2, to the capacitor 51. In the case where the received voltage exceeds a specified value, the state illustrated in FIG. 11A and the state illustrated in FIG. 11B are repeated alternately. That is, the received voltage is not output to the rectifier circuit 52.

Accordingly, even when the power receiving coil 31 receives an electromagnetic field or a magnetic field larger than a specified value, interruption of power reception at the rectifier circuit 52 enables interruption of electric power, and influence such as heat generation caused by reception of large power in the rectifier circuit 52 and circuits provided downstream of the rectifier circuit 52 can be reduced.

Figure 12A:
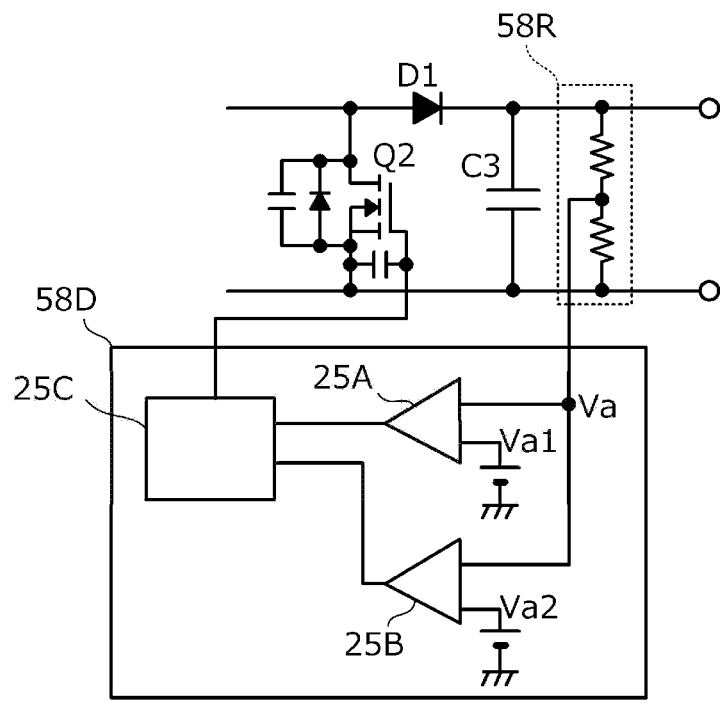
FIGS. 12A and 12B are diagrams illustrating examples of the configuration of a received voltage detecting circuit illustrated in FIG. 9.
Figure 12B:
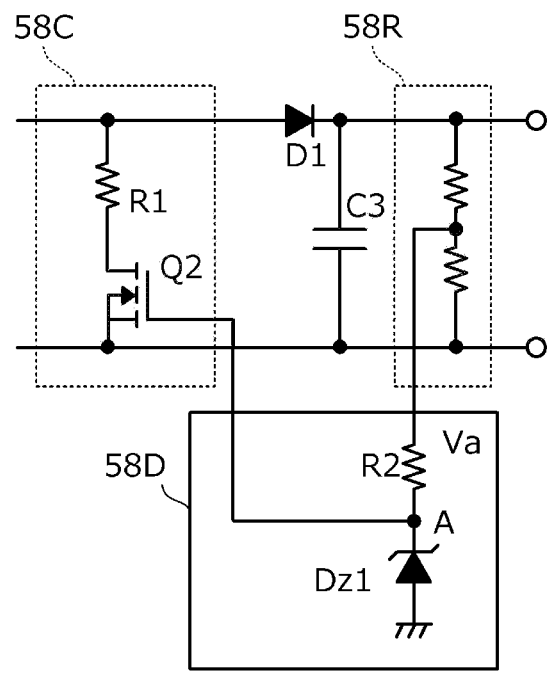

FIGS. 12A and 12B are diagrams illustrating examples of the configuration of the received voltage detecting circuit 58D illustrated in FIG. 9.

In the example illustrated in FIG. 12A, the received voltage detecting circuit 58D includes comparators 25A and 25B and a controller 25C. The comparator 25A compares a received voltage Va with a threshold voltage Va1. When Va is more than Va1, the comparator 25A outputs an H level signal (H: high potential). When Va is less than or equal to Va1, the comparator 25A outputs an L level signal (L: low potential). The comparator 25B compares the received voltage Va with a threshold voltage Va2. When Va is more than Va2, the comparator 25B outputs an H level signal. When Va is less than or equal to Va2, the comparator 25B outputs an L level signal (L).

The controller 25C outputs a gate signal to the FET Q2 in accordance with signals output from the comparators 25A and 25B. Specifically, when both the signals output from the comparators 25A and 25B represent L, that is, when Va is less than Va1, the controller 25C turns off the FET Q2. When the signal output from the comparator 25A represents H and the signal output from the comparator 25B represents L, that is, when the relationship Va1<Va<Va2 is obtained, the controller 25C outputs a pulse signal to the gate of the FET Q2 and turns on and off the FET Q2. When both the signals output from the comparators 25A and 25B represent H, that is, when Va2 is less than Va, the controller 25C turns on the FET Q2.

The interruption circuit 58C in FIG. 12B includes a resistor R1 and the FET Q2. The received voltage detecting circuit 58D includes a series circuit including a resistor R2 and a Zener diode Dz1. A connection point A between the resistor R2 and the Zener diode Dz1 is connected to the gate of the FET Q2.

With this configuration, in the case where the received voltage Va is less than the Zener voltage of the Zener diode Dz1, the potential of the connection point A represents L (low potential), and the FET Q2 is turned off. Thus, the potential of the connection point between the resistor R1 and the FET Q2 becomes H (high potential), and no current flows to the resistor RE When the received voltage Va increases and exceeds the Zener voltage, the potential of the connection point A becomes H (high potential), and the FET Q2 is turned on. Thus, the potential of the connection point between the resistor R1 and the FET Q2 becomes L (low potential), and current flows to the resistor RE The Zener voltage is set to protect the voltage input to the gate of the FET Q2.

When the received voltage Va exceeds the Zener voltage and the FET Q2 is turned on, a power reception interruption state is entered. Thus, charging of the capacitor C3 stops, and the received voltage Va drops. When the received voltage Va decreases to be lower than the Zener voltage, the potential of the connection point A becomes L, and the FET Q2 is turned off again. Then, when the received voltage Va exceeds the Zener voltage again, the FET Q2 is turned on. By repeating the states described above, received voltage is suppressed from becoming excessive.

When the received voltage Va is higher than a specified value (equal to or more than the threshold voltage Va2), the FET Q2 is turned on, and a power reception interruption state is entered. Then, the interruption circuit 58C maintains the interruption state until the received voltage Va decreases to be lower than the Zener voltage, and power reception thus stops.

Figure 13:
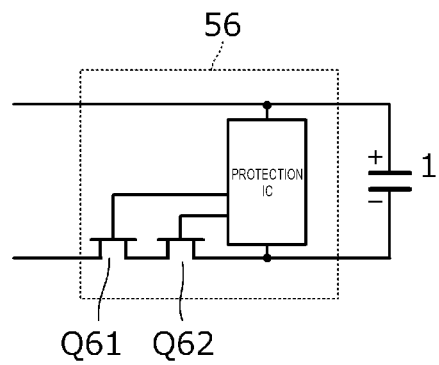
FIG. 13 is a circuit diagram illustrating a specific example of a protection circuit 56.

FIG. 13 is a circuit diagram illustrating a specific example of the protection circuit 56. The protection circuit 56 includes a protection IC that detects the voltage across the secondary battery 1 and FETs Q61 and Q62. The protection IC controls the gate voltage of the FETs Q61 and Q62 to interrupt a charging current path to the secondary battery 1 when the voltage applied to the secondary battery 1 exceeds a predetermined voltage.

Second Embodiment

In a second embodiment, an example of a universal-battery-outer-shape wirelessly chargeable battery applied to a coin-type battery is illustrated.

Figure 14:
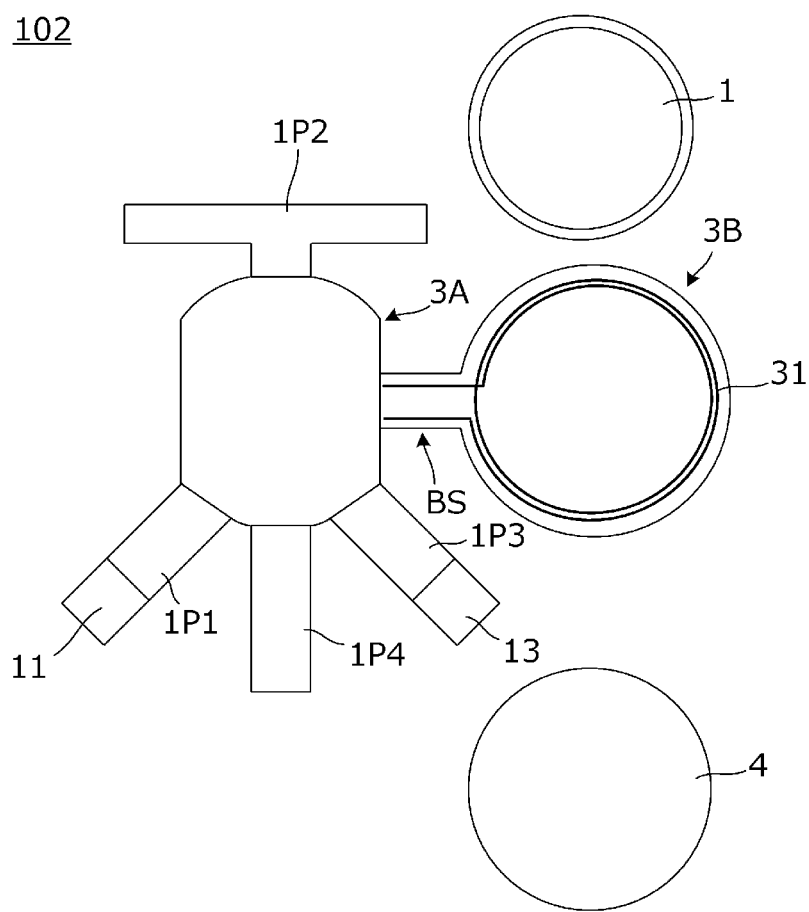
FIG. 14 is a plan view illustrating a state in which a universal-battery-outer-shape wirelessly chargeable battery according to a second embodiment is developed.
Figure 15:
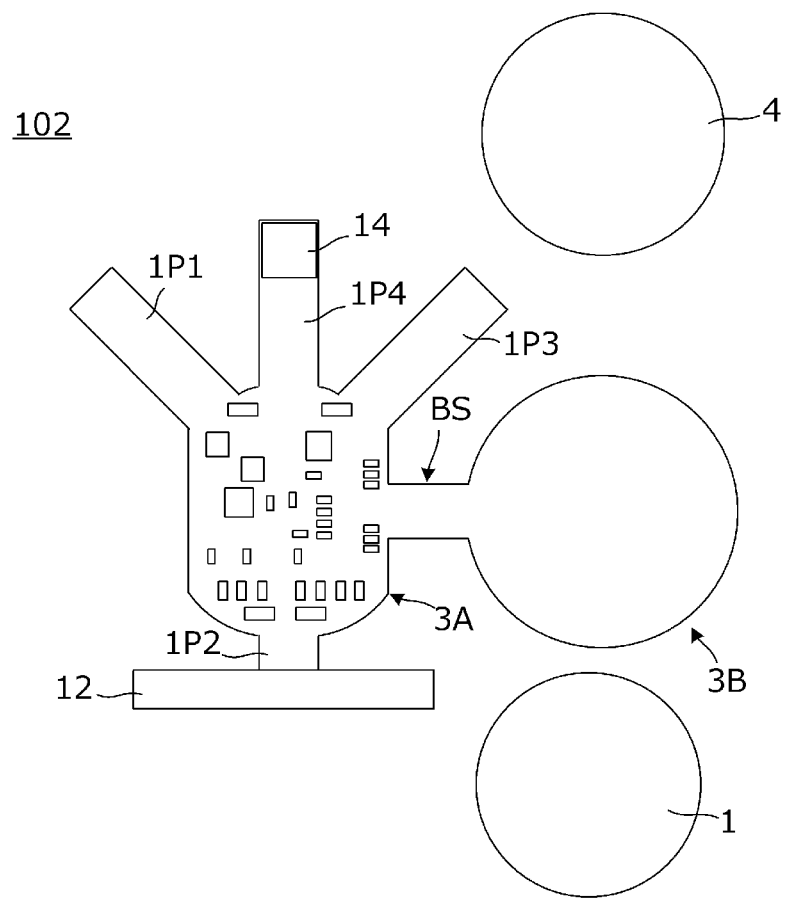
FIG. 15 is a bottom view illustrating a state in which the universal-battery-outer-shape wirelessly chargeable battery is developed.
Figure 16:
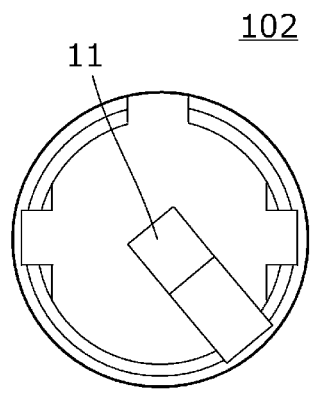
FIG. 16 is a bottom view of the universal-battery-outer-shape wirelessly chargeable battery.

FIG. 14 is a plan view of a state in which a universal-battery-outer-shape wirelessly chargeable battery 102 according to the second embodiment is developed, and FIG. 15 is a bottom view of the state in which the universal-battery-outer-shape wirelessly chargeable battery 102 is developed. FIG. 16 is a bottom view of the universal-battery-outer-shape wirelessly chargeable battery 102.

A substrate includes a first section 3A, a second section 3B, and a bent section BS. The first section 3A is a main section of a circuit. The power receiving coil 31 is formed in the second section 3B. The secondary battery 1 is a coin-shaped secondary battery. An electrode 14 is in contact with the negative pole of the secondary battery 1 and is electrically connected, and electrodes 12 and 13 are in contact with the positive pole of the secondary battery 1 and is electrically connected.

The power receiving coil 31 is magnetically or electromagnetically coupled to the power transmitting coil 900 of the power transmission device 90. The power receiving coil 31 receives high-frequency power, rectifies and smooths the received high-frequency power, and charges the secondary battery arranged inside. The voltage of the secondary battery can be directly extracted to the outside. Thus, the universal-battery-outer-shape wirelessly chargeable battery 102 may be used as a coin-type battery that is chargeable and dischargeable.

An assembling procedure of the universal-battery-outer-shape wirelessly chargeable battery 102 is as described below.

(1) As illustrated in FIG. 14, by arranging the first section 3A at the center and folding a protruding section 1P4 to 180 degrees onto the top face of the first section 3A, the protruding section 1P4 is made in contact with the first section 3A. Then, the secondary battery 1 is arranged in such a manner that the positive pole of the secondary battery 1 is in contact with the electrode 14.

(2) A protruding section 1P3 is folded to about 180 degrees to be in contact with the negative pole on the top face of the secondary battery 1.

(3) A magnetic sheet 4 of a disc shape that is one size larger than the secondary battery 1 is placed on the top face of the protruding section 1P3 on the secondary battery 1 in such a manner that the magnetic sheet 4 covers the secondary battery 1.

(4) The bent section BS is folded to 180 degrees, and the power receiving coil 31 is arranged on the top face of the disc-shape magnetic sheet 4.

(5) A protruding section 1P2 is folded upwards to 90 degrees, and the electrode 12 is arranged along a side face of the secondary battery 1. Thus, the electrode 12 is exposed on the side face of the universal-battery-outer-shape wirelessly chargeable battery 102 and operates as an external connection electrode of a positive pole for a device in which the universal-battery-outer-shape wirelessly chargeable battery 102 is to be inserted.

(6) A protruding section 1P1 is folded to 180 degrees towards the first section 3A. Thus, the electrode 11 is exposed below the universal-battery-outer-shape wirelessly chargeable battery 102 and operate as an external connection electrode of a negative pole for a device in which the universal-battery-outer-shape wirelessly chargeable battery 102 is to be inserted.

(7) With the electrodes 11 and 12 exposed, the entire universal-battery-outer-shape wirelessly chargeable battery 102 is sealed with resin, and the outer shape of the universal-battery-outer-shape wirelessly chargeable battery 102 thus has the shape of a coin battery.

In accordance with the assembling procedure described above, the universal-battery-outer-shape wirelessly chargeable battery 102 used as a chargeable and dischargeable coin-shape battery, as illustrated in FIG. 16.

Third Embodiment

In a third embodiment, an example of a circuit that performs, under the control of a rectifier element, interruption of power reception is described.

Figure 17:
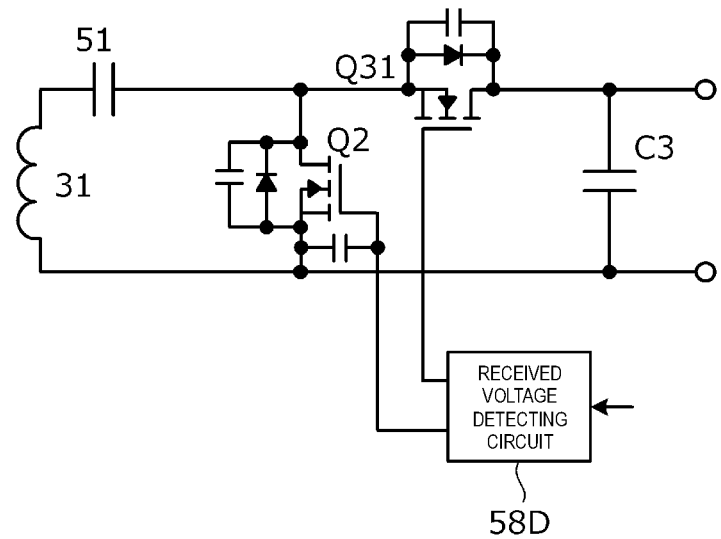
FIG. 17 is a diagram illustrating a configuration of an interruption circuit of a universal-battery-outer-shape wirelessly chargeable battery according to a third embodiment.
Figure 18:
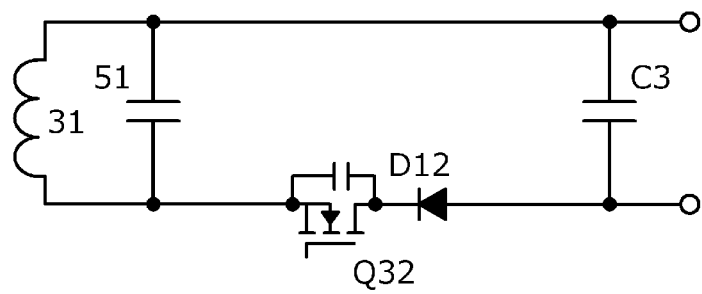
FIG. 18 is a diagram illustrating another configuration of the interruption circuit of the universal-battery-outer-shape wirelessly chargeable battery according to the third embodiment.

FIGS. 17 and 18 are diagrams each illustrating a configuration of an interruption circuit of a universal-battery-outer-shape wirelessly chargeable battery according to the third embodiment. In FIG. 17, FETs Q2 and Q31 configure a synchronous rectifier circuit. The received voltage detecting circuit 58D controls a synchronous rectifying operation by controlling the FETs Q2 and Q31. That is, to interrupt power reception, the FET Q2 is turned on and the FET Q31 is turned off.

In FIG. 18, an FET Q32 and a diode D12 configure a rectifier circuit. The received voltage detecting circuit 58D controls a rectifying operation by controlling the FET Q32. That is, to interrupt power reception, the FET Q32 is turned off.

Fourth Embodiment

In a fourth embodiment, an example of the configuration of a power reception protecting circuit that includes a bridge rectifier circuit is described.

Figure 19:
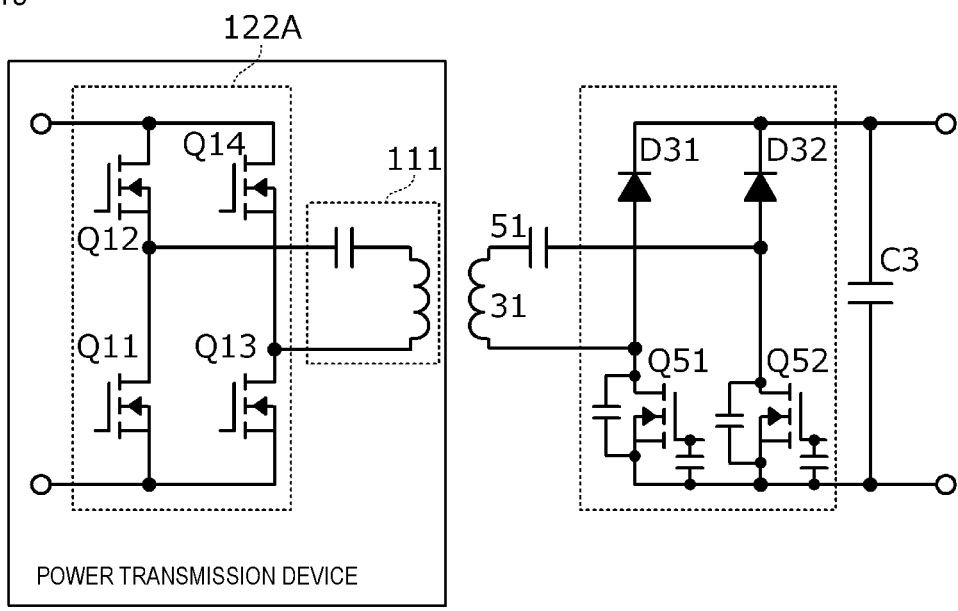
FIG. 19 is a circuit diagram of part of a universal-battery-outer-shape wirelessly chargeable battery and a power transmission device according to a fourth embodiment.
Figure 20:
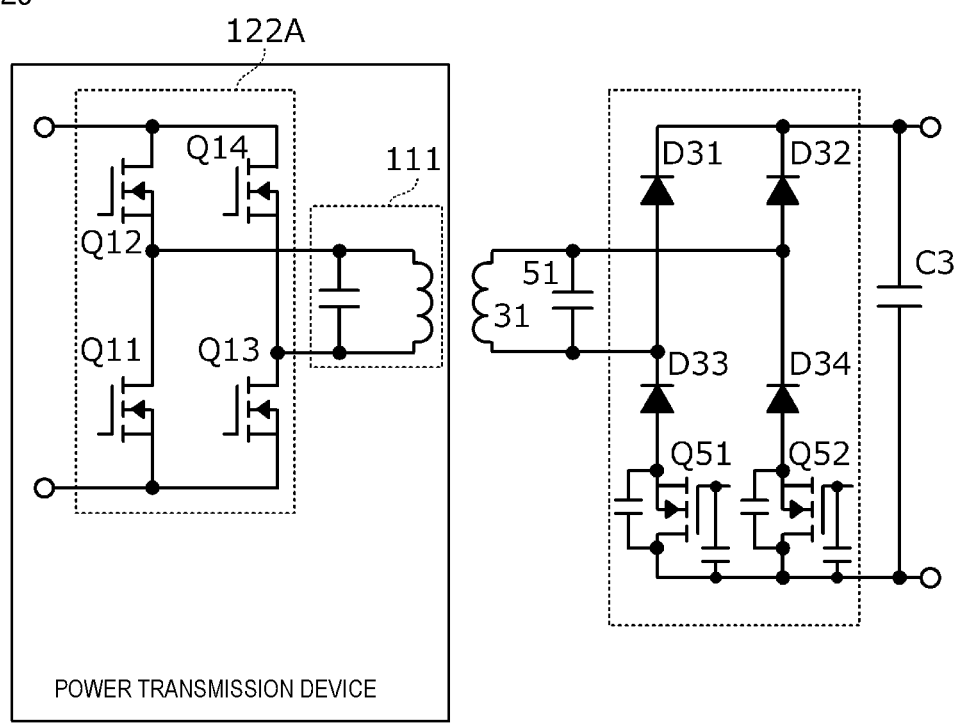
FIG. 20 is a circuit diagram of part of another universal-battery-outer-shape wirelessly chargeable battery and a power transmission device according to the fourth embodiment.

FIGS. 19 and 20 are circuit diagrams each illustrating part of a universal-battery-outer-shape wirelessly chargeable battery and a power transmission device according to the fourth embodiment.

In FIG. 19, the power transmission device includes a transmission-side resonant circuit 111 and a power transmission circuit 122A. In the power transmission circuit 122A, a series circuit including FETs Q11 and Q12 and a series circuit including FETs Q13 and Q14 are connected in parallel. By turning on and off the FETs Q11 and Q14 and the FETs Q12 and Q13 alternately, a DC voltage from a DC power source is converted into an AC voltage and the AC voltage is supplied to the transmission-side resonant circuit 111.

In FIG. 19, a series circuit including an FET Q51 and a diode D31 and a series circuit including an FET Q52 and a diode D32 are connected in parallel to configure a rectifier circuit. The FETs Q51 and Q52 are switching-controlled by the received voltage detecting circuit 58D (FIG. 9).

In FIG. 20, a diode bridge rectifier circuit including diodes D31, D32, D33, and D34 and FETs Q51 and Q52 is provided. The example illustrated in FIG. 20 is different from the example illustrated in FIG. 19 in the directions of the drains and sources of the FETs Q51 and Q52.

In both FIGS. 19 and 20, the FETs Q51 and Q52 are turned off in the case where power reception is interrupted, and rectification by the diodes D31, D32, D33, and D34 is blocked.

Fifth Embodiment

In a fifth embodiment, a circuit configuration of a universal-battery-outer-shape wirelessly chargeable battery that is different from the example of the circuit configuration illustrated in FIG. 6 is described.

Figure 21:
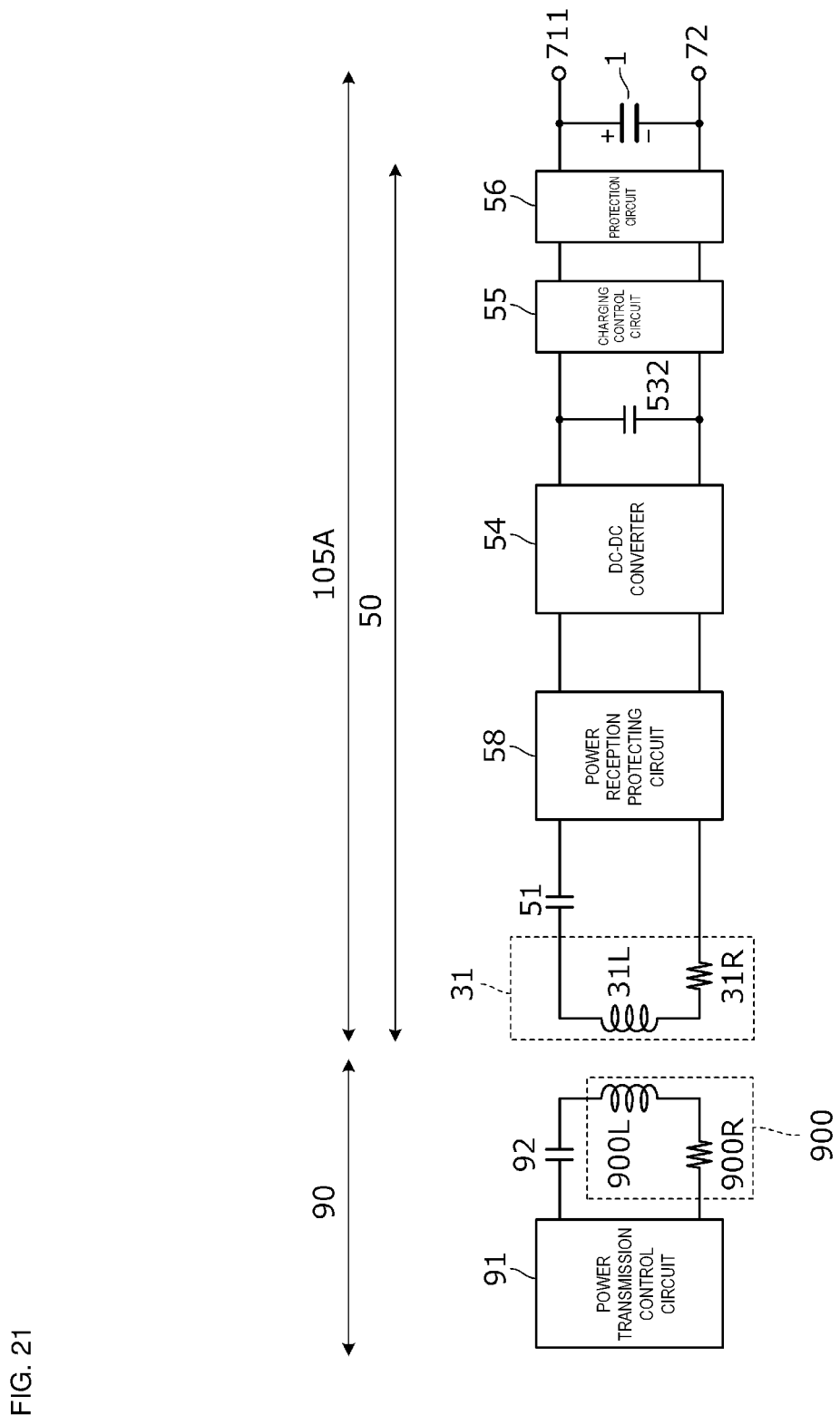
FIG. 21 is a circuit diagram of a universal-battery-outer-shape wirelessly chargeable battery according to a fifth embodiment.

FIG. 21 is a circuit diagram of a universal-battery-outer-shape wirelessly chargeable battery 105A according to the fifth embodiment. The universal-battery-outer-shape wirelessly chargeable battery 105A includes the DC-DC converter 54, the charging control circuit 55, the secondary battery 1, and the protection circuit 56. The protection circuit 56 protects against overvoltage input to the secondary battery 1 and protects against overcurrent discharge from the secondary battery 1. A temperature sensor may be connected to the protection circuit 56 so that overheat protection can be performed. The other configuration features are similar to those in the example illustrated in FIG. 6. However, in the example illustrated in FIG. 21, the voltage regulator 57 is not provided. An output unit of the secondary battery 1 may be connected to the positive terminal 711 and the negative terminal 72, as illustrated in FIG. 21.

Figure 22:
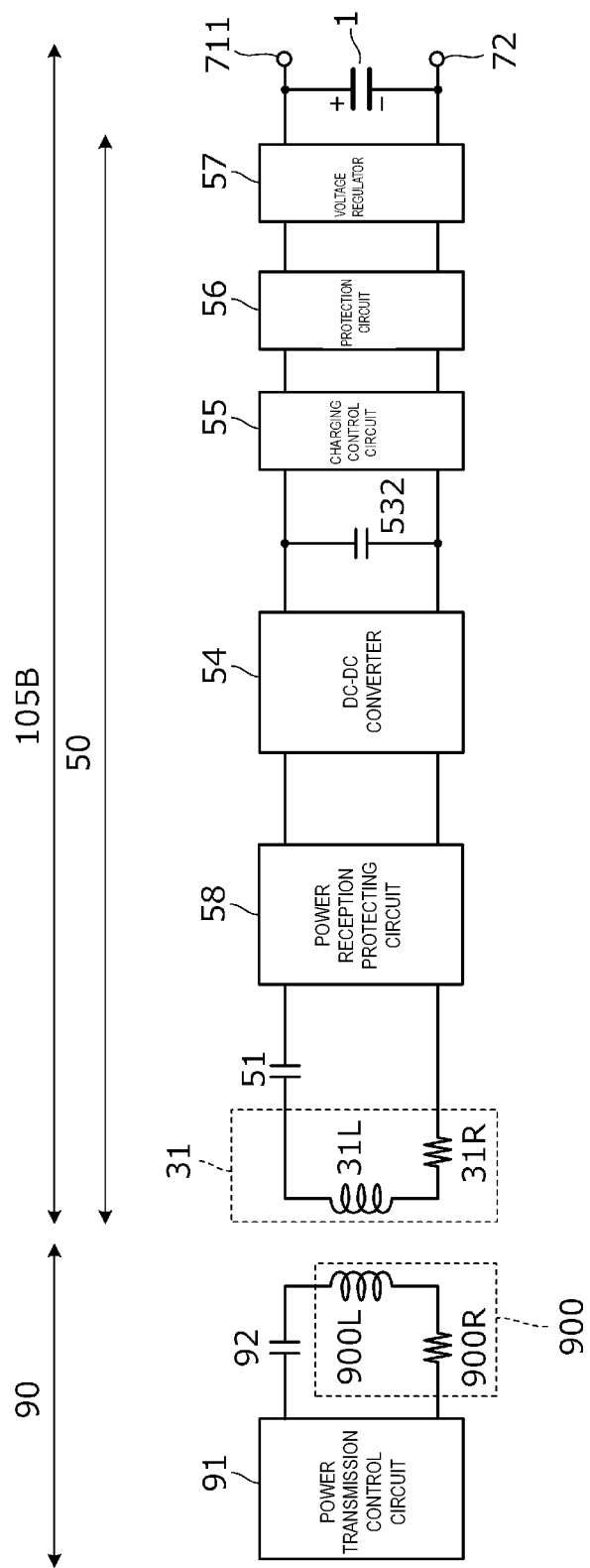
FIG. 22 is a circuit diagram of a universal-battery-outer-shape wirelessly chargeable battery according to the fifth embodiment.

FIG. 22 is a circuit diagram of a universal-battery-outer-shape wirelessly chargeable battery 105B according to the fifth embodiment. The universal-battery-outer-shape wirelessly chargeable battery 105B includes the DC-DC converter 54, the charging control circuit 55, the secondary battery 1, the protection circuit 56, and the voltage regulator 57. The other configuration features are similar to those in the example illustrated in FIG. 6. The voltage regulator 57 may be directly connected to the secondary battery 1, as illustrated in FIG. 22.

Sixth Embodiment

In a sixth embodiment, a circuit configuration of a universal-battery-outer-shape wirelessly chargeable battery that includes a transmission circuit is described.

Figure 23:
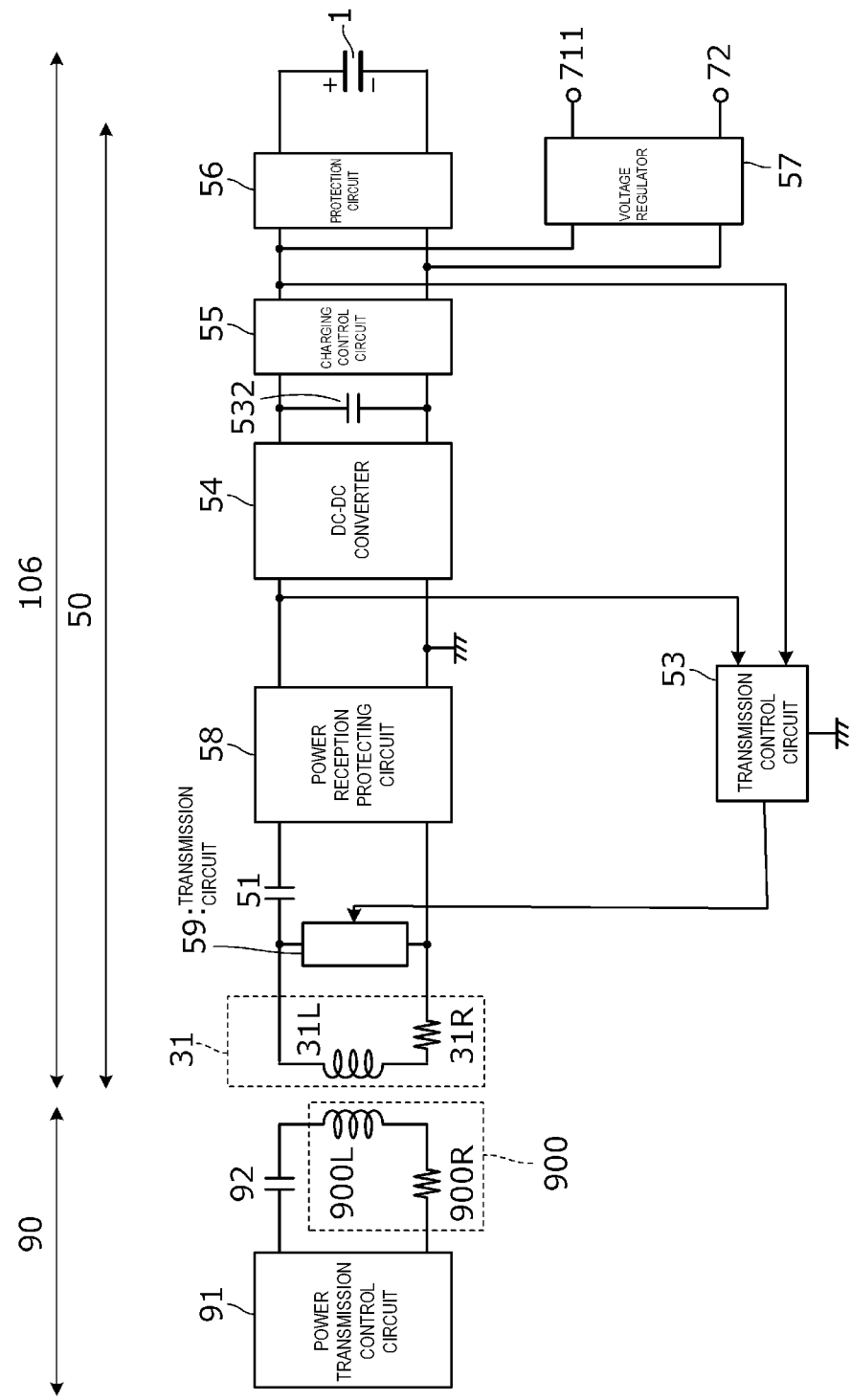
FIG. 23 is a circuit diagram of a universal-battery-outer-shape wirelessly chargeable battery according to a sixth embodiment.

FIG. 23 is a circuit diagram of a universal-battery-outer-shape wirelessly chargeable battery 106 according to the sixth embodiment. The universal-battery-outer-shape wirelessly chargeable battery 106 includes the power receiving coil 31, the rectifier circuit 52, the DC-DC converter 54, the charging control circuit 55, the secondary battery 1, the voltage regulator 57, a transmission control circuit 53, and a transmission circuit 59.

The transmission control circuit 53 detects whether or not the voltage output from the rectifier circuit 52 exceeds a specified value and detects whether or not the voltage of the secondary battery 1 has reached a specified value. The transmission circuit 59 changes the size of the load of the power receiving coil 31. For example, the transmission circuit 59 performs 2-level ASK (amplitude-shift keying) by changing the load on the power reception side in accordance with backscatter modulation similar to a passive RFID tag. Alternatively, the transmission circuit 59 changes resonant conditions of a resonant circuit including the power receiving coil 31 and the resonant capacitor 51, and transmits a signal according to the change. For example, the composite capacitance of the resonant capacitor 51 and the transmission circuit 59 is changed, so that the resonant frequency of the resonant circuit is displaced. Thus, the impedance of the resonant circuit viewed from the power transmission device is changed. Accordingly, the power transmission device receives a communication signal. The transmission circuit 59 corresponds to a "signal transmission circuit" according to the present disclosure. The other configuration features are the same as those of the universal-battery-outer-shape wirelessly chargeable battery 101A illustrated in FIG. 6.

In the case where the voltage output from the rectifier circuit 52 exceeds the specified value, the transmission control circuit 53 causes the transmission circuit 59 to perform load modulation or displaces the resonant frequency of the resonant circuit, and thus transmits a code (communication signal) representing a state in which excessive power is received. Furthermore, when the voltage charging the secondary battery 1 has reached the specified value, by causing the transmission circuit 59 to perform load modulation or displacing the resonant frequency of the resonant circuit, the transmission control circuit 53 transmits a code (communication signal) representing a fully charged state. The power transmission device stops power transmission or controls transmission power, in accordance with the received code.

Seventh Embodiment

In a seventh embodiment, a circuit configuration of a universal-battery-outer-shape wirelessly chargeable battery that includes a reception circuit is described.

Figure 24:
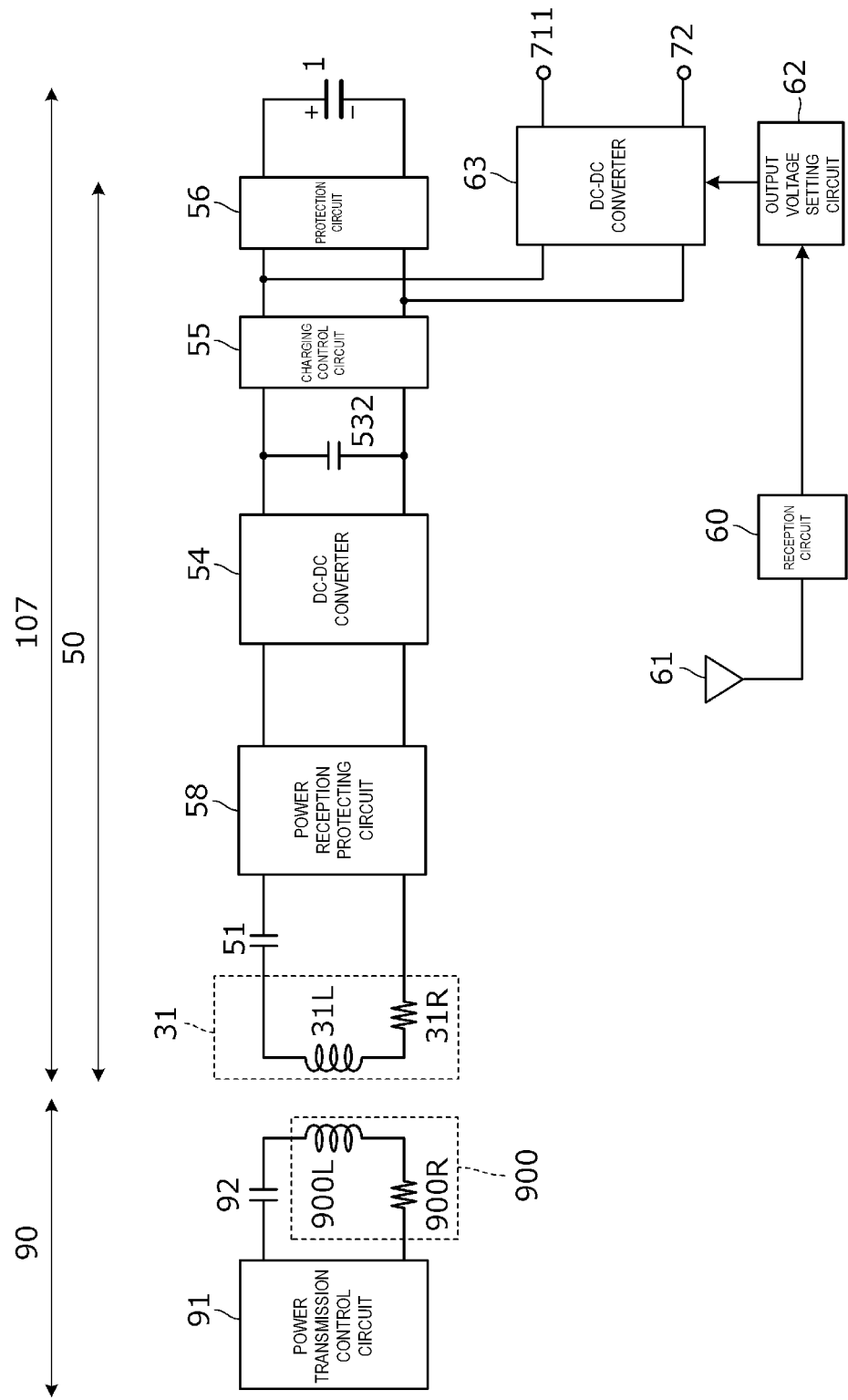
FIG. 24 is a circuit diagram of a universal-battery-outer-shape wirelessly chargeable battery according to a seventh embodiment.

FIG. 24 is a circuit diagram of a universal-battery-outer-shape wirelessly chargeable battery 107 according to the seventh embodiment. The universal-battery-outer-shape wireless rechargeable battery 107 includes the power receiving coil 31, the rectifier circuit 52, the DC-DC converter 54, the charging control circuit 55, the secondary battery 1, a DC-DC converter 63, a reception circuit 60, an antenna 61, and an output voltage setting circuit 62. The other configuration features are the same as those of the universal-battery-outer-shape wirelessly chargeable battery 101A illustrated in FIG. 6.

The reception circuit 60 receives a wireless signal from the outside. The output voltage setting circuit 62 controls the DC-DC converter 63 in accordance with a signal received at the reception circuit 60, and determines the voltage to be output from the universal-battery-outer-shape wirelessly chargeable battery 107. That is, the universal-battery-outer-shape wirelessly chargeable battery 107 operates as a universal-battery-outer-shape wirelessly chargeable battery that outputs a voltage corresponding to a control signal supplied from the outside.

Other Embodiments

In each of the embodiments described above, an example in which a lithium-ion battery is used as the secondary battery 1 has been described. However, the secondary battery 1 may be an electrical double layer capacitor. Alternatively, the secondary battery 1 may be a solid-state battery.

Materials described below are examples of a positive electrode active material, a negative electrode active material, and a solid electrolyte of the above-mentioned solid-state battery.

<Positive Electrode Active Material>

For example, at least one kind selected from a group consisting of a lithium-containing phosphate compound having a NASICON-type structure, a lithium-containing phosphate compound having an olivine-type structure, a lithium-containing layered oxide, a lithium-containing compound having a spinel-type structure, and the like.

<Negative Electrode Active Material>

And, for example, at least one kind selected from a group consisting of an oxide containing at least a type of element selected from a group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, a lithium-containing oxide having a spinel-type structure, and the like.

<Solid Electrolyte>

For example, a lithium-containing phosphate compound having a NASICON structure, an oxide having a perovskite structure, an oxide having a garnet-type structure or a structure similar to the garnet-type structure, and the like may be used. The lithium-containing phosphate compound having a NASICON structure may be $Li_xM_y(PO_4)_3$ ($1 \leq x \leq 2$, $1 \leq y \leq 2$, M represents at least one kind selected from a group consisting of Ti, Ge, Al, Ga, and Zr). The lithium-containing phosphate compound having a NASICON structure may be, for example, $Li_{1.2}Al_{0.2}Ti_{1.8}(PO_4)_3$. The oxide having a perovskite structure may be, for example, $La_{0.55}Li_{0.35}TiO_3$. The oxide having a garnet-type structure or a structure similar to the garnet-type structure may be, for example, $Li_7La_3Zr_2O_{12}$.

The embodiments described above should be considered by way of example in all respects, but not limiting. Modifications and changes may be made in an appropriate manner by those skilled in the art. The scope of the present disclosure is defined by the claims, but not by the embodiments described above, and is intended to encompass changes from the embodiments within the meaning and scope equivalent to the claims.

What is claimed is:

1. A wirelessly chargeable battery comprising:
a secondary battery;
a wireless charging circuit that is connected to the secondary battery;
a housing body that has an outer shape equivalent to an outer shape of a battery of a predetermined size and accommodates the secondary battery and the wireless charging circuit; and
a positive terminal and a negative terminal that are electrically connected to the secondary battery and are at positions corresponding to positions of a positive terminal and a negative terminal, respectively, of the battery of the predetermined size,
wherein the wireless charging circuit includes a power receiving coil that is configured to receive an electromagnetic field or a magnetic field having a predetermined size caused by power transmission from an outside of the wirelessly chargeable battery, a rectifier circuit that is configured to rectify a received voltage received at the power receiving coil, a first voltage conversion circuit that is configured to convert a voltage output from the rectifier circuit to generate a charging voltage, a charging control circuit that is configured to receive a voltage output from the first voltage conversion circuit and control charging of the secondary battery, a second voltage conversion circuit that is configured to convert a voltage of the secondary battery into an output voltage to be output from the wirelessly chargeable battery, and a power reception protecting circuit that is configured to protect the first voltage conversion circuit in a case where the received voltage exceeds a predetermined voltage range, and
wherein the wirelessly chargeable battery is configured to attach to an electronic device that uses the battery of the predetermined size, and the wireless charging circuit is configured to enable wireless charging using the electromagnetic field caused by power transmission from the outside of the wirelessly chargeable battery.

2. The wirelessly chargeable battery according to claim 1, wherein
the power reception protecting circuit includes an interruption circuit that is configured to stop power reception at the rectifier circuit in a case where the received voltage exceeds the predetermined voltage range.

3. The wirelessly chargeable battery according to claim 2, wherein
the power receiving coil is located closer to an outer surface of the housing body than the secondary battery is, and
the wirelessly chargeable battery further comprises:
a magnetic layer between the power receiving coil and the secondary battery.

4. The wirelessly chargeable battery according to claim 2, further comprising:
a cushion layer that is configured to moderate impact of the secondary battery.

5. The wirelessly chargeable battery according to claim 2, wherein
the secondary battery is an electrical double layer capacitor.

6. The wirelessly chargeable battery according to claim 2, wherein
the secondary battery is a solid-state battery.

7. The wirelessly chargeable battery according to claim 2, further comprising:
a transmission circuit that is configured to transmit a communication signal in accordance with a change of a load of a circuit connected to the power receiving coil.

8. The wirelessly chargeable battery according to claim 2, wherein
the wireless charging circuit includes a protection circuit that is configured to protect against at least one of overcurrent, overvoltage, and overheat at a time of charging and discharging the secondary battery.

9. The wirelessly chargeable battery according to claim 2, wherein
the wireless charging circuit includes a reception circuit that is configured to receive a wireless signal from the outside of the wirelessly chargeable battery, and an output voltage setting circuit that is configured to control the second voltage conversion circuit to determine the output voltage, in accordance with a reception signal received at the reception circuit.

10. The wirelessly chargeable battery according to claim 2, wherein the wireless charging circuit includes a resonant capacitor that is connected to the power receiving coil, the resonant capacitor and the power receiving coil configuring a resonant circuit that is configured to resonate at a frequency of the electromagnetic field or the magnetic field.

11. The wirelessly chargeable battery according to claim 1, wherein
the power receiving coil is located closer to an outer surface of the housing body than the secondary battery is, and
the wirelessly chargeable battery further comprises:
a magnetic layer between the power receiving coil and the secondary battery.

12. The wirelessly chargeable battery according to claim 1, further comprising:
a cushion layer that is configured to moderate impact of the secondary battery.

13. The wirelessly chargeable battery according to claim 1, wherein
the secondary battery is an electrical double layer capacitor.

14. The wirelessly chargeable battery according to claim 1, wherein
the secondary battery is a solid-state battery.

15. The wirelessly chargeable battery according to claim 1, further comprising:
a transmission circuit that is configured to transmit a communication signal in accordance with a change of a load of a circuit connected to the power receiving coil.

16. The wirelessly chargeable battery according to claim 1, wherein
the wireless charging circuit includes a protection circuit that is configured to protect against at least one of overcurrent, overvoltage, and overheat at a time of charging and discharging the secondary battery.

17. The wirelessly chargeable battery according to claim 1, wherein
the wireless charging circuit includes a reception circuit that is configured to receive a wireless signal from the outside of the wirelessly chargeable battery, and an output voltage setting circuit that is configured to control the second voltage conversion circuit to determine the output voltage, in accordance with a reception signal received at the reception circuit.

18. The wirelessly chargeable battery according to claim 1, wherein
the wireless charging circuit includes a resonant capacitor that is connected to the power receiving coil, the resonant capacitor and the power receiving coil configuring a resonant circuit that is configured to resonate at a frequency of the electromagnetic field or the magnetic field.

19. The wirelessly chargeable battery according to claim 1, further comprising:
a signal transmission circuit that is configured to transmit a signal in accordance with a change of power consumption of a circuit connected to the power receiving coil.

20. The wirelessly chargeable battery according to claim 18, further comprising:
a signal transmission circuit that is configured to transmit a signal in accordance with a change of a resonant condition of the resonant circuit.

* * * * *